US007546433B2

(12) United States Patent
Ozaki et al.

(10) Patent No.: US 7,546,433 B2
(45) Date of Patent: Jun. 9, 2009

(54) STORAGE SYSTEM, AND DATA MANAGEMENT AND MIGRATION METHOD

(75) Inventors: Satoru Ozaki, Hiratsuka (JP); Yoshihito Nakagawa, Ooi (JP)

(73) Assignee: Hitachi, Ltd., Tokyo (JP)

( * ) Notice: Subject to any disclaimer, the term of this patent is extended or adjusted under 35 U.S.C. 154(b) by 477 days.

(21) Appl. No.: 11/580,833

(22) Filed: Oct. 16, 2006

(65) Prior Publication Data

US 2008/0059744 A1 Mar. 6, 2008

(30) Foreign Application Priority Data

Aug. 29, 2006 (JP) ............................ 2006-232727

(51) Int. Cl.
*G06F 12/00* (2006.01)
(52) U.S. Cl. ..................... 711/165; 711/203; 711/112
(58) Field of Classification Search ..................... None
See application file for complete search history.

(56) References Cited

U.S. PATENT DOCUMENTS 7,124,143 B2   10/2006   Matsunami et al.
2006/0129537 A1   6/2006   Torii et al.

FOREIGN PATENT DOCUMENTS

JP   2005-353035   2/2005
JP   2006-164211   3/2005

*Primary Examiner*—Kevin Verbrugge
(74) *Attorney, Agent, or Firm*—Reed Smith LLP; Juan Carlos A. Marquez, Esq.

(57) ABSTRACT

A storage system or data management and migration method enabling migration of an access destination for a host system without having to stop the transmission of data between the host system and storage apparatuses. The storage system includes: a host system that issues a data read/write request; an external storage apparatus that provides an external logical volume for storing the data; and a first storage apparatus that creates a first virtual logical volume. In this system, the host system makes a request to the first storage apparatus to map volume information composed of the management information for the external logical volume; in response to the mapping request, the first storage apparatus maps the volume information for the external logical volume onto the first virtual logical volume and sends the volume information for the external logical volume and first virtual logical volume to the host system; based on the volume information for the external logical volume sent from the first storage apparatus, the host system searches for any virtual logical volume having the same volume information as the volume information for the first virtual logical volume or external logical volume, and sets the virtual logical volume searched for in this search as an alternate volume for receiving requests to read/write data from/to the external logical volume.

12 Claims, 24 Drawing Sheets

FIG.2

| VOLUME NAME (71A) | VOLUME INFORMATION (71B) ||||
|---|---|---|---|---|
| | VENDER ID (71C) | SERIAL NUMBER (71D) | VOLUME TYPE (71E) | ... (71F) |
| X | a | b | c | ... |
| Y | d | e | f | ... |
| ⋮ | ⋮ | ⋮ | ⋮ | ... |

| ALTERNATE VOLUME ATTRIBUTE (72A) | VOLUME NAME (72B) | VOLUME INFORMATION MODE (72C) |
|---|---|---|
| ON | Y | SELF-VOL |
| | X | ON |
| | Z | OFF |
| | ⋮ | ⋮ |

72

STORAGE SYSTEM, AND DATA MANAGEMENT AND MIGRATION METHOD

CROSS-REFERENCES TO RELATED APPLICATIONS

This application relates to and claims priority from Japanese Patent Application No. 2006-232727, filed on Aug. 29, 2006, the entire disclosure of which is incorporated herein by reference.

BACKGROUND

1. Field of the Invention

The invention relates generally to a storage system and data management and migration method, and is suitable for use in a storage system where volumes have to be migrated between different types of storage apparatuses.

2. Description of Related Art

In storage systems handling a large amount of data, the data has been managed using large-capacity storage apparatuses provided separately from host systems.

The storage apparatuses used in these storage systems have many hard disk devices arranged in arrays and are configured so that the hard disk devices are used according to the RAID (Redundant Array of Independent Inexpensive Disks) system. These hard disk devices provide physical storage areas, for which at least one or more logical volumes ("logical volume(s)") are set.

In these storage systems, when introducing a new storage apparatus or transferring the processing performed by a storage apparatus to another, clustered storage apparatus, the access destination for the host system has to be migrated to the newly-introduced storage apparatus or the other storage apparatus. In such cases, the migration of the access destination for the host system is ideally made without suspending the transmission of data between the host system and storage apparatuses.

A technique for changing an access target for a host system between storage apparatuses or volumes is disclosed in Japanese Patent Laid-Open Publication No. 2005-353035. A technique for migrating data between files is disclosed in Japanese Patent Laid-Open Publication No. 2006-164211.

However, with the existing methods for migrating the access destination for the host system to a new storage apparatus, there is a problem in that because cable replacement is required, the transmission of data between the host system and storage apparatuses has to be temporarily suspended.

Moreover, when migrating the access destination for the host system between different types of storage apparatuses (e.g., between an old-type storage apparatus and new-type storage apparatus made by the same vendor, or between storage apparatuses made by different vendors), it has been essential to change the micro program in the migration source storage apparatus, involving complex change processing for the migration.

This invention has been devised in light of these points and aims to propose a storage system and data management and migration method, with which an access destination for a host system can be migrated without having to stop the transmission of data between the host system and storage apparatuses.

SUMMARY

In order to achieve the foregoing object, this invention provides a storage system that includes: a host system that issues a data read/write request; an external storage apparatus that provides an external logical volume for storing the data; and a first storage apparatus that creates a first virtual logical volume. In this storage system, the host system makes a request to the first storage apparatus to map volume information composed of management information for the external logical volume; in response to the mapping request, the first storage apparatus maps the volume information for the external logical volume onto the first virtual logical volume and sends the volume information for the external logical volume and first virtual logical volume to the host system; based on the volume information for the external logical volume sent from the first storage apparatus, the host system searches for any virtual logical volume having the same volume information as the volume information for the first virtual logical volume or external logical volume, and sets the virtual logical volume searched for in this search as an alternate volume for receiving requests to read/write data from/to the external logical volume.

As a result, the host system can migrate its access destination to the first virtual logical volume in the first storage apparatus without having to suspend the transmission of data between itself and the storage apparatus.

This invention also provides a data management and migration method performed in a storage system including a host system that issues a data read/write request; an external storage apparatus that provides an external logical volume for storing the data; and a first storage apparatus that creates a first virtual logical volume. This method includes: a step in which the host system makes a request to the first storage apparatus to map volume information composed of management information for the external logical volume; a step in which, in response to the mapping request, the first storage apparatus maps the volume information for the external logical volume onto the first virtual logical volume and sends the volume information for the external logical volume and first virtual logical volume to the host system; and a step in which, based on the volume information for the external logical volume sent from the first storage apparatus, the host system searches for any virtual logical volume having the same volume information as the volume information for the first virtual logical volume or external logical volume, and sets the virtual logical volume searched for in this search as an alternate volume for receiving requests to read/write data from/to the external logical volume.

As a result, the host system can migrate its access destination to the first virtual logical volume in the first storage apparatus without having to suspend the transmission of data between itself and the storage apparatus.

According to this invention, it is possible to change the access destination of the host system to a new storage apparatus without having to suspend the transmission of data between the host system and storage apparatuses.

Moreover, when migrating the access destination for the host system between different types of storage apparatuses (e.g., between an old-type storage apparatus and new type-storage apparatus made by the same vendor, or between storage apparatuses made by different vendors), it is unnecessary to change the micro program in the migration source storage apparatus, so the change processing required for the migration can be performed smoothly.

BRIEF DESCRIPTION OF THE DRAWINGS

FIG. 2 is a chart showing a volume information table according to Embodiment 1.

FIG. 3 is a chart showing an alternate volume information table according to Embodiment 1.

DETAILED DESCRIPTION OF PREFERRED EMBODIMENTS

Embodiments of this invention will be explained with reference to the attached drawings.

(1) Embodiment 1

(1-1) Storage System Structure in Embodiment 1

First, the storage system according to Embodiment 1 is explained below.

Figure 1:
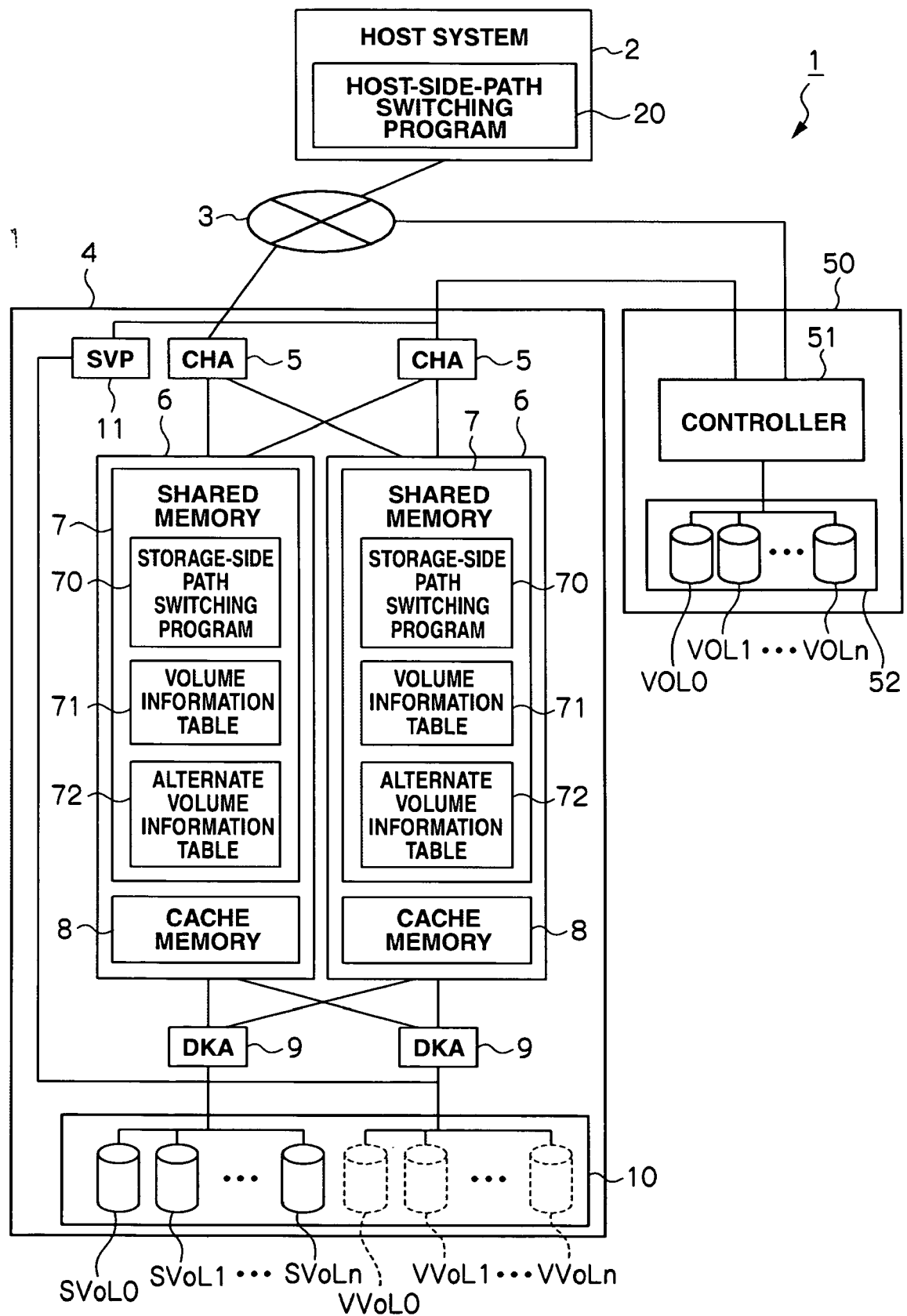
FIG. 1 is a block diagram showing the overall structure of a storage system according to Embodiment 1.

In FIG. 1, reference numeral 1 indicates the overall storage system according to Embodiment 1. In this storage system 1, a host system 2 is connected to a storage apparatus 4 via a network 3 and the storage apparatus 4 is connected to an external storage apparatus 50.

The host system 2 is a computer, for example, a personal computer, work station, or main frame, that has information processing resources such as a CPU (Central Processing Unit) and memory. It also includes information input devices (not shown in the drawing) such as a keyboard, switches, pointing device, and microphone; and information output devices (not shown in the drawing) such as a monitor display and speaker. A host-side path switching program 20 is run on the host system 2.

The network 3 is, for example, a SAN (Storage Area Network), a LAN (Local Area Network), the Internet, a public line, or a private line. If the network 3 is a SAN, communication between the host system and storage apparatuses via the network 3 is carried out based on Fibre Channel Protocol; meanwhile, if the network 3 is a LAN, the communication is carried out based on TCP/IP (Transmission Control Protocol/Internet Protocol) protocol.

The storage apparatus 4 is composed of: a plurality of channel adapters 5; a plurality of memory units 6; a plurality of disk adapters 9; hard disk drive unit 10; and service processor 11. Transmission of data and commands between the channel adapters 5, memory units 6 and disk adapters 9 is conducted via a bus or switch such as an ultrahigh-speed crossbar switch, which transmits data by high-speed switching.

Each channel adapter 5—structured as a microcomputer system having a CPU, memory and communication interfaces—has ports for connection with the network 3 and external storage apparatus 50. It interprets various kinds of commands sent from the host system 2 and carries out the required processing. The ports of each channel adapter 5 are assigned network addresses (e.g., IP addresses or WWNs) for identifying themselves so that each channel adapter 5 can independently serve as NAS (Network Attached Storage).

Each memory unit 6 is composed of a plurality of shared memory units 7 and a plurality of cache memory units 8.

Each shared memory 7 is storage memory shared by the channel adapters 5 and disk adapters 9. It is used mainly for storing system configuration information and various control programs read from system volumes when the storage apparatus 4 is powered on, and commands from the host system 2. It also stores a storage-side path switching program 70, volume information table 71, and alternate volume information table 72. Details will be given later.

Each cache memory 8 is storage memory shared by the channel adapters 5 and disk adapters 9. It is used mainly for temporarily storing user data input/output from/to the storage apparatus 4.

Each disk adapter 9 is structured as a microcomputer system having a microprocessor and memory, and functions as an interface for controlling protocols used for communication with the hard disk drive unit 10. Each disk adapter 9 is connected to the hard disk drive unit 10 via, for example, Fibre Channel cable, and transmits/receives data to/from the hard disk drive unit 10 in accordance with Fibre Channel Protocol.

The service processor 11 is a computer operated for the maintenance or management of the storage apparatus 4 and an example is a laptop personal computer. It detects any failure occurring in the storage apparatus 4 and shows it on the display screen (not shown in the drawing).

The hard disk drive unit 10 is composed of a plurality of hard disk drives (not shown in the drawing), for example, expensive hard disk drives such as SCSI (Small Computer System Interface) disks or inexpensive hard disk drives such as SATA (Serial AT Attachment) disks.

These hard disk drives provide storage areas for which one or more logical volumes are defined. The host system 2 writes/reads data to/from these logical volumes in units of blocks of a predetermined size.

Each logical volume is assigned a unique identifier (LUN: Logical Unit Number). In Embodiment 1, input/output of user data is carried out by designating an address composed of such an identifier and a number (LBA: Logical Block Address) uniquely assigned to each block.

Examples of attributes of the logical volumes created in the storage apparatus 4 include substantial volume SVOL0-n and virtual volumes VVOL0-n.

The substantial volumes SVOL0-n are logical volumes with allocated storage areas, and data can actually be input/output to/from these volumes.

The virtual volumes VVOL0- n are logical volumes that do not exist in reality. These virtual volumes VVOL0-n are associated with one or more substantial volumes SVOL0-n. When a data input/output request is made by the host system 2 to one of the virtual volumes VVOL0-n, the data is written/read to/from the substantial volume SVOL0-n associated with that virtual volume.

The external storage apparatus 50 is composed of a hard disk drive unit 52 composed of a plurality of hard disk drives; and a controller 51 for controlling input/output of data to the hard disk drive unit 52.

The hard disk drive unit 52 has the same structure as the hard disk drive unit 10 in the storage apparatus 4, i.e., the hard disk drives in the disk drive unit 52 provide storage areas, for which one or more logical volumes ("external volumes") VOL0-n are set.

In the storage system 1 structured as above, when the host system 2 issues a data write/read request, the data is written/read with the following procedure. First, when the host system 2 issues a data write request, the data is sent to the external storage apparatus 50 via the network 3. When the controller 51 in the external storage apparatus 50 receives the data, it writes it in the external volumes VOL0-n.

Meanwhile, when the host system 2 issues a data read request, the data stored in the volumes VOL0-n is read. The read data is received by the controller 51 and then by the host system 2 via the network 3.

(1-2) Volume Switching Function

The volume switching function provided in the storage system 1 according to Embodiment 1 will now be explained.

This storage system 1 is characterized in that the migration of a volume the host system recognizes is carried out by mapping the same information as the volume information in an external volume VOL0-n onto a virtual volume VVOL0-n in a new storage apparatus 4; and setting this virtual volume VVOL0-n having the mapped information as an alternate volume.

An alternate volume refers to a virtual volume VVOL0-n to be accessed by the host system 2 in place of an external volume VOL0-n the host system 2 had been accessing.

In order to realize this volume switching function, the host system 2 is provided with the host-side path switching program 20 and the storage apparatus 4 stores in its shared memory 7 the storage-side path switching program 70, volume information table 71, and alternate volume information table 72.

The host-side path switching program 20 is for setting a virtual volume VVOL0-n in the storage apparatus 4 as an alternate volume, so that the host system 2 can access it as the access destination instead of accessing an external volume VOL0-n in the external storage apparatus 50.

The volume information table 71 is for managing the information unique to the external volumes VOL0-n in the external storage apparatus 50 and virtual volumes VVOL0-n in the storage apparatus 4 so that these external volumes VOL0-n and virtual volumes VVOL0-n can be identified respectively.

As shown in FIG. 2, this table has a "volume name" field 71A and "volume information" field 71B.

The "volume name" field 71A stores the names of external volumes VOL0-n and virtual volumes sVVOL0-n.

The "volume information" field 71B stores the management information for the volumes and is mainly composed of a "vendor ID" field 71C, "serial number" field 71D, and "volume type" field 71E and so on.

The "vendor ID" field 71C stores the vendor IDs of the external volumes VOL0-n and virtual volumes VVOL0-n while the "serial number" field 71D stores the serial numbers of the external volumes VOL0-n and virtual volumes VVOL0-n. Also, the "volume type" field 71E stores the types of formats used in the external volumes VOL0-n and virtual volumes VVOL0-n, the formats being compatible with the host system 2.

In addition to the fields 71C to 71E, the "volume information" field 71B also includes another field 71F for storing, for example, the volume management information such as the capacities and maximum data transfer lengths of the external volumes VOL0-n and virtual volumes VVOL0-n.

The alternate volume information table 72 stores the information concerning whether the external volumes VOL0-n and virtual volumes VVOL0-n can be used as alternate volumes. As shown in FIG. 3, the alternate volume information table 72 is composed of an "alternate volume attribute" field 72A, "volume name" field 72B and "volume information mode" field 72C.

The "alternate volume attribute" field 72A stores the information for the usage attribute, showing whether or not the virtual volumes VVOL0-n in the storage system 1 are used as alternate volumes. To be precise, in the "alternate volume attribute" field 72A, either "ON" meaning that the virtual volumes VVOL0-n in the storage apparatus 4 can be used as alternate volumes; or "OFF" meaning that they are not used as alternate volumes but used as normal virtual volumes VVOL0-n is entered.

The "volume name" field 72B stores the names of external volumes VOL0-n and virtual volumes VVOL0-n. The "volume information mode" field 72C stores the information concerning whether the volume information for the external volumes VOL0-n and virtual volumes VVOL0-ncan be used for alternate volumes when setting the virtual volumes VVOL0-n as the alternate volumes.

In the case shown in the table 72 in Embodiment 1, the word "self-VOL" entered in the "volume information mode" field 72C indicates that the volume named "Y" is the storage system 4's own volume. "ON" entered in the same field 72C indicates that the volume named "X" can be used as an alternate volume. "OFF" indicates that the volume named "Z" cannot be used as an alternate volume. Accordingly, in this case, even when the alternate volume attribute is "ON," the volume "Z" cannot be used as an alternate volume.

(1-3) Procedure to Work Volume Switching Function

The procedure to work the volume switching function will now be explained with reference to the foregoing tables.

Figure 4:
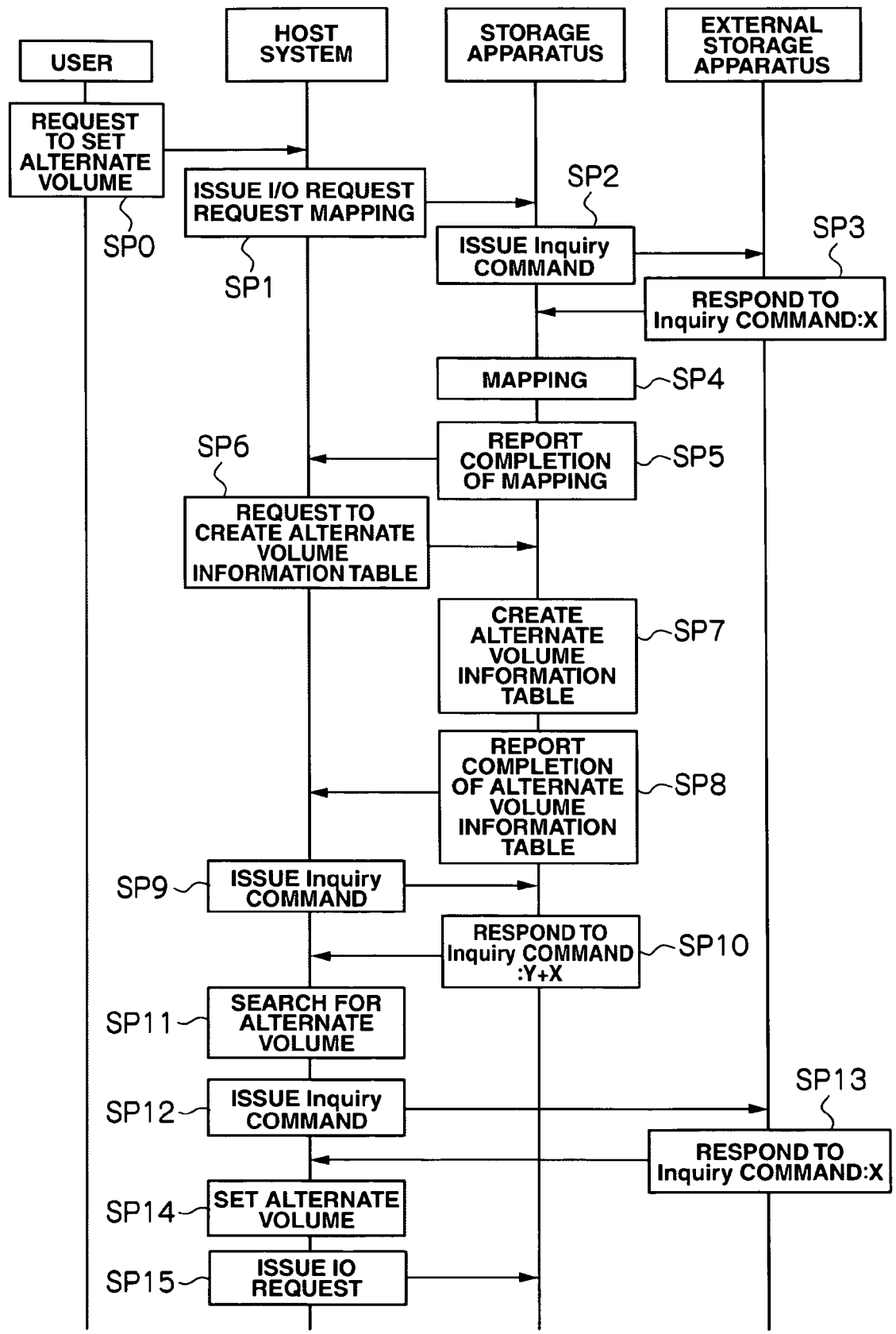
FIG. 4 shows a sequence explaining the volume switching function according to Embodiment 1.

As shown in FIG. 4, with the storage system 1, a user inputs an order to set an alternate volume (SP0).

Figure 5:
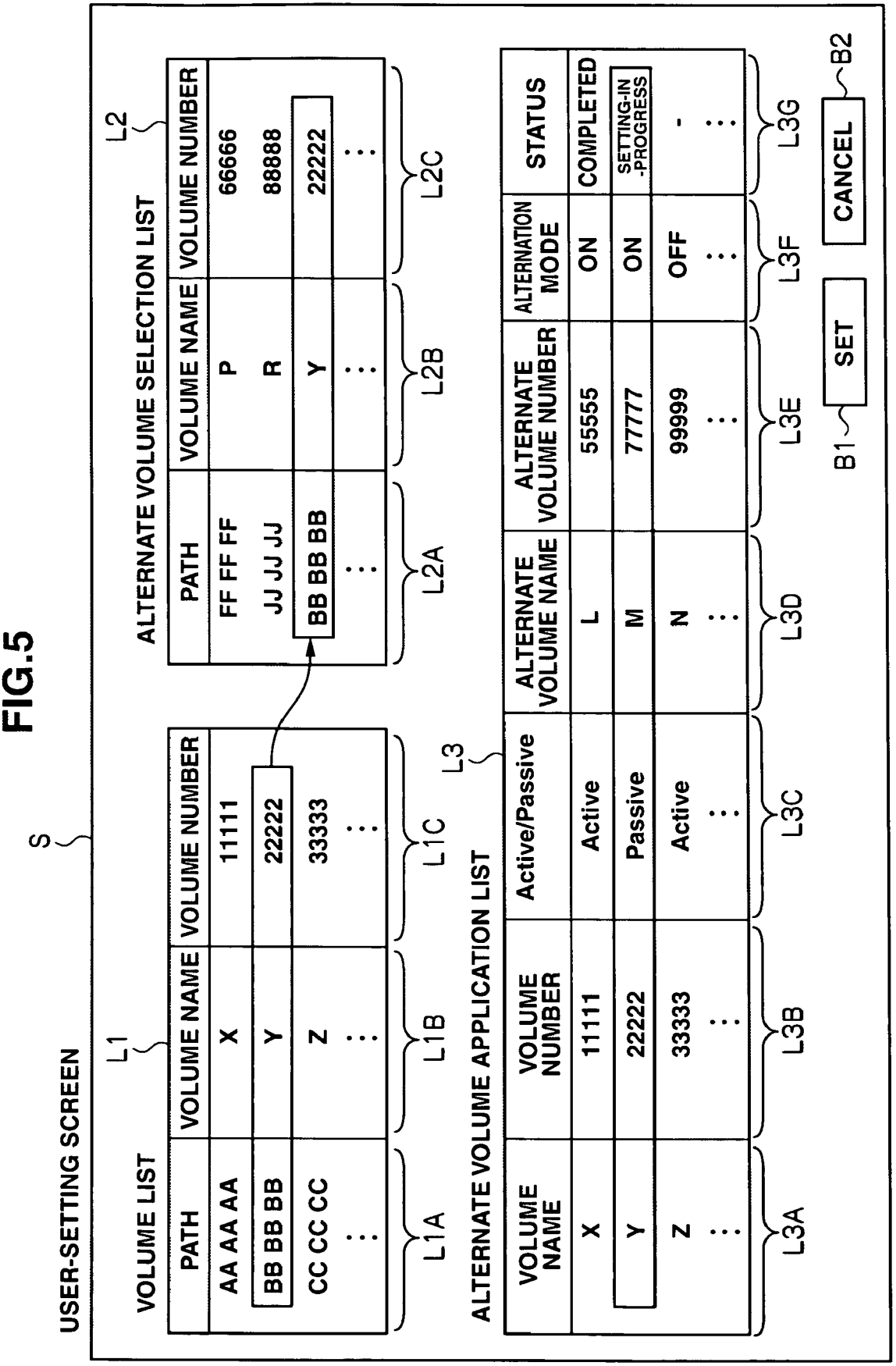
FIG. 5 shows the display content of a user-setting screen according to Embodiment 1.

FIG. 5 shows a user-setting screen S displayed on the display of the service processor 11, with which the user inputs an order. First, the user selects, from the volume list L1 shown on the upper left side of the screen, a volume he/she wants to use as an alternate volume.

In Embodiment 1, it is assumed that, from among the virtual volumes VVOL0-n in the storage apparatus 4, the virtual volume "Y" ("volume Y") VVOLy is selected.

Then, when the alternate volume selection list L2 appears on the upper right side of the user-setting screen S, the user checks whether the selected volume Y VVOLy is listed on the alternate volume selection list L2.

After the user checks that the volume Y VVOLy is on the alternate volume selection list L2, it again selects the volume Y VVOLy in that list.

After that, from among the "set" button B1 and "cancel" button B2 shown on the bottom right side of the user-setting screen S, the user presses the "set" button B1. Then, the user can check that the volume Y VVOLy is in "setting-in-progress" status by referring to the "status" field L3G in the alternate volume application list L3 shown on the user-setting screen S.

The information stored in the respective lists L1 to L3 will be explained next.

The volume list L1 is for storing the information for the external volumes VOL0-n and virtual volumes VVOL0-n.

The "path" field L1A in the volume list L1 stores the path addresses of the external volumes VOL0-n and virtual volumes VVOL0-n. The "volume name" field L1B stores the names of the external volumes VOL0-n and virtual volumes VVOL0-n and the "volume number" field L1C stores the numbers of the external volumes VOL0-n and virtual volumes VVOL0-n.

Meanwhile, the alternate volume selection list L2 is for storing the information for virtual volumes VVOL0-n that can be alternate volumes. The "path" field L2A in this alternate volume selection list L2 stores the path addresses of the virtual volumes VVOL0-n.

The "volume name" field L2B stores the names of the virtual volumes VVOL0-n. The "volume number" field L2C stores the numbers of the virtual volumes VVOL0-n.

The alternate volume application list L3 is for storing the information concerning which volumes from among the external volumes VOL0-n and virtual volumes VVOL0-n are applied as alternate volumes.

The "volume name" field L3A and "volume number" field L3B store the same information as in the "volume name" field L1B and "volume number" field L1C in the volume list L1, so their explanations will be omitted.

The "active/passive" field L3C stores priority information, showing which volumes data read/write requests are preferentially issued to. If "active" is entered, it means that data read/write requests are issued preferentially to that volume. Meanwhile, if "passive" is entered, it means that data read/write requests are not issued preferentially to that volume but issued preferentially to another volume set as an alternate volume.

The "alternate volume name" field L3D stores the names of virtual volumes VVOL0-n that become alternate volumes for the external volumes VOL0-n and virtual volumes VVOL0-n listed in the "volume name" field L3A. The "alternate volume number" field L3E stores the number of the alternate volumes.

The "alternation mode" field L3F stores the mode information concerning whether the user is using an alternate volume or not. The "status" field L3G stores the information concerning whether a volume is set as an alternate volume or not.

When the user completes the input of alternate volume configurations with the service processor 11, the host system 2 issues a data read/write request to an external volume VOL0-n in the external storage apparatus 50 and sends a mapping request to the storage apparatus 4 (SP1).

Figure 6:
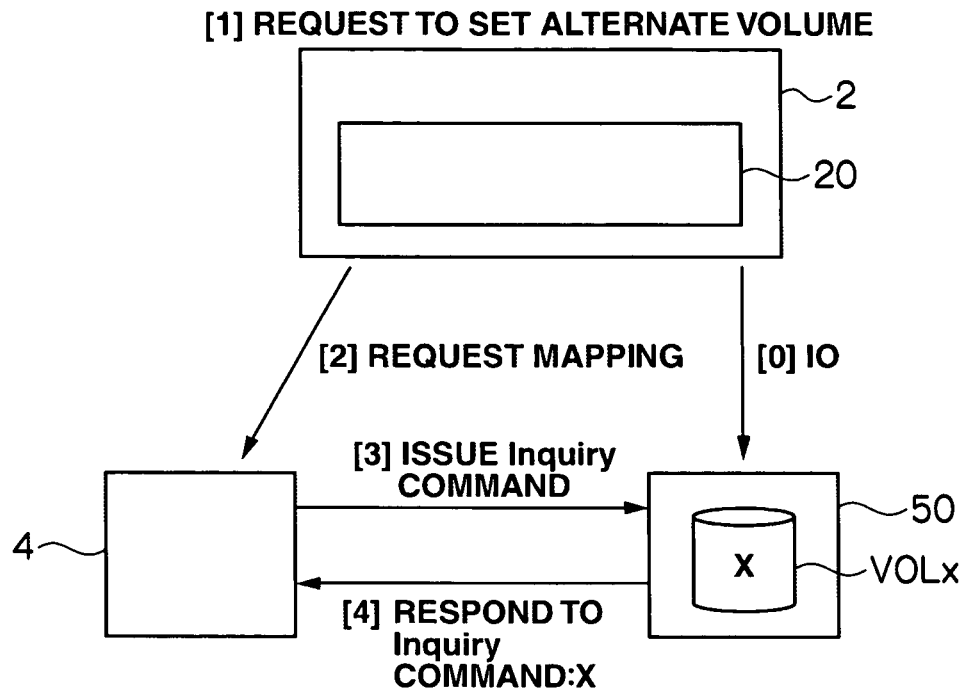
FIG. 6 is a diagram explaining the concept of the volume switching function according to Embodiment 1.

For example, it is assumed that, as shown in FIG. 6, while the host system 2 issues a data read/write request to a substantial volume named "X" ("volume X VOLx") from among the external volumes VOL0-n in the external storage apparatus 50, the user inputs in the host system 2 a request to set the volume Y VVOLy as an alternate volume for the volume X VOLx ([0], [1]).

Accordingly, as shown in FIG. 6, the host system 2 sends a mapping request to the storage apparatus 4, requesting that the volume information in the volume X VOLx in the external storage apparatus 50 be mapped onto the volume Y VVOLy in the storage apparatus 4 ([2]). In other words, the volume X VOLx in the external storage apparatus 50 is a migration source volume and the volume Y VVOLy in the storage apparatus 4 is a migration destination volume.

Having received this mapping request, the storage apparatus 4 issues an inquiry command to the external storage apparatus 50 (SP2). To be precise, as shown in FIG. 6, the storage apparatus 4 issues a command to the external storage apparatus 50, requesting that the volume information for the volume X VOLx in the external storage apparatus 50 be sent to the storage apparatus 4 ([3]).

Having received this inquiry command, the external storage apparatus 50 sends a response to the storage apparatus 4 (SP3). To be precise, as shown in FIG. 6, the external storage apparatus 50 sends the volume information for the volume X VOLx to the storage apparatus 4 ([4]).

Figure 7:
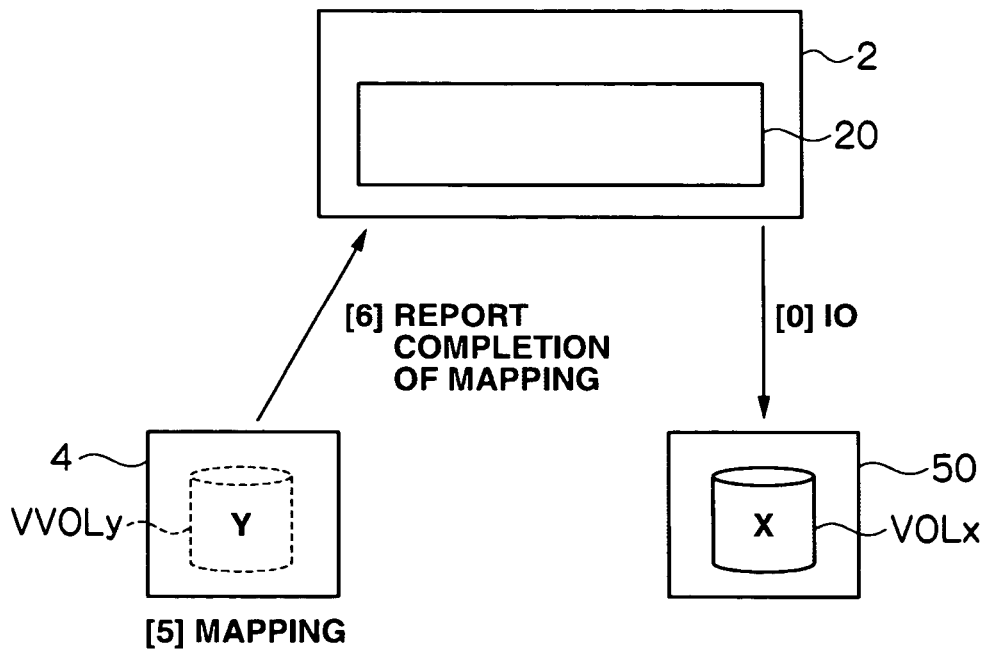
FIG. 7 is a diagram explaining the concept of the volume switching function according to Embodiment 1.

Then, the storage apparatus 4 maps the volume information for the volume X VOLx onto the virtual volume Y VVOLy in the volume information table 71 (SP4). Volume information is the unique information each volume has. As shown in FIG. 7, the volume information for the volume X VOLx is mapped onto the volume Y VVOLy ([5]). Here, in the storage apparatus 4, the volume information table 71 previously storing the management information for the storage apparatus 4's own volume Y VVOLy is updated because the management information for the volume X VOLx has been added.

When the volume information table 71 is updated, the storage apparatus 4 notifies the host system 2 that mapping is complete (SP5). To be precise, as shown in FIG. 7, the storage apparatus 4 sends a completion notice to the host system 2 ([6]). In the meantime, data read/write requests have been successively issued from the host system 2 to the volume X VOLx in the external storage apparatus 50 ([0]).

Figure 8:
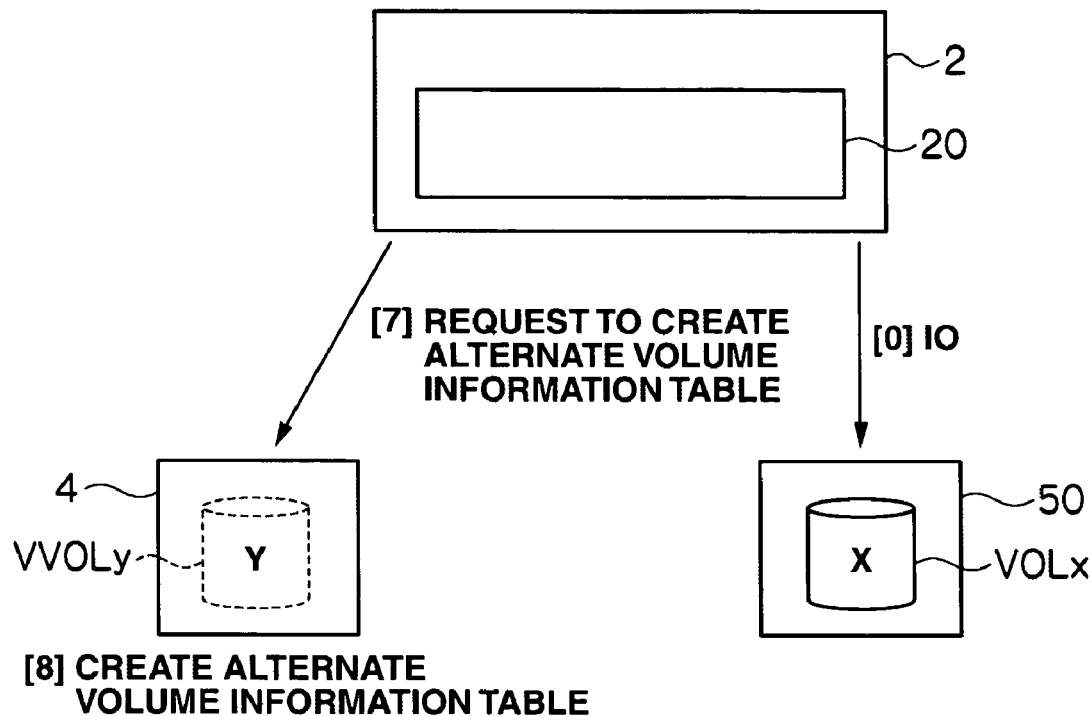
FIG. 8 is a diagram explaining the concept of the volume switching function according to Embodiment 1.

Having received the completion notice, the host system 2 sends a request to create an alternate volume information table 72 to the storage apparatus 4 (SP6). Then, as shown in FIG. 8, the storage apparatus 4 receives that table creation request from the host system 2 ([7]).

The storage apparatus 4 then creates an alternate volume information table 72 (SP7). As shown in FIG. 8, the storage apparatus 4 maps the volume information for the volume X VOLx onto the volume Y VVOLy already storing its own volume information ([8]). In the meantime, data read/write requests have been successively issued from the host system 2 to the volume X VOLx in the external storage apparatus 50 ([0]).

In Embodiment 1, in the "alternate volume attribute" field 72A in the alternate volume information table 72, "ON" is entered so that virtual volumes VVOL0-n in the storage apparatus 4 can be used as alternate volumes. The names of the volumes "Y" and "X" are entered in the "volume name" field 72 B. In the "volume information mode" field 72C, "self-VOL" is entered for the volume Y VVOLy and "ON" is entered for the volume X VOLx. This "ON" entered in the "volume information mode" field 72C indicates that the virtual volume VVOL0-n storing the same information as the volume X VOLx can be set as an alternate volumes.

Figure 9:
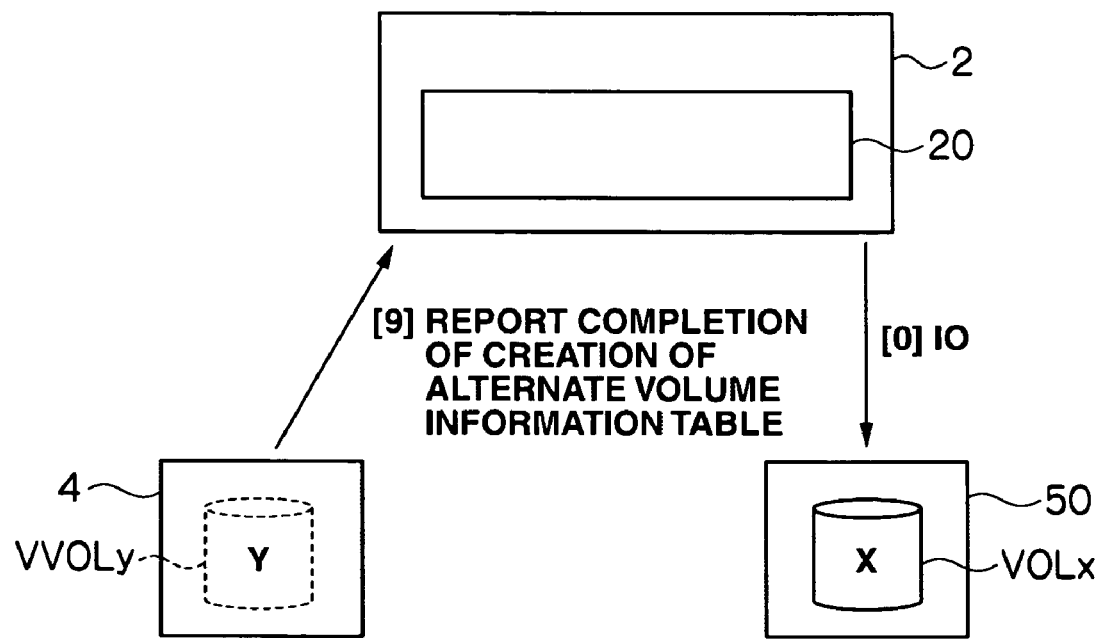
FIG. 9 is a diagram explaining the concept of the volume switching function according to Embodiment 1.

When the storage apparatus 4 completes the alternate volume information table 72, it notifies the host system 2 of that fact (SP8). This is shown in FIG. 9 ([9]). Incidentally, in the meantime, data read/write requests have been successively issued from the host system 2 to the volume X VOLx in the external storage apparatus 50 ([0]).

Figure 10:
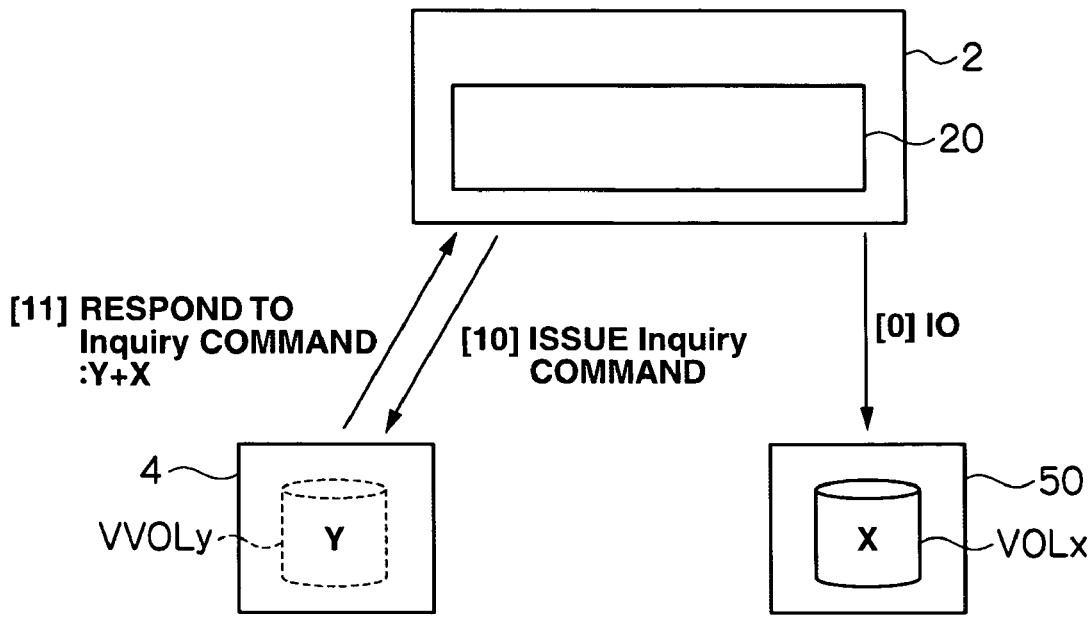
FIG. 10 is a diagram explaining the concept of the volume switching function according to Embodiment 1.

Then, the host system 2 issues an inquiry command to the storage apparatus 4 (SP9). This is shown in FIG. 10 ([10]). In the meantime, data read/write requests have been successively issued from the host system 2 to the volume X VOLx in the external storage apparatus 50 ([0]).

Having received the inquiry command, the storage apparatus 4 sends a response to the host system 2 (SP10). To be precise, as shown in FIG. 10, the storage apparatus 4 sends, in response to the inquiry command, both the volume information for the volume Y VVOLy, which is the storage apparatus 4's own information, and the volume information for the volume X VOLx mapped from the external volume X VOLx in the external storage apparatus 50, to the host system 2 ([11]). In the meantime, data read/write requests have been successively issued from the host system 2 to the volume X VOLx in the external storage apparatus 50 ([0]).

After checking that "ON" is entered in the "alternate volume attribute" field 72A in the obtained alternate volume information table 72, the host system 2 searches for an alternate volume based on the volume information for the volume Y VVOLy and volume X VOLx obtained in response to the inquiry command (SP11).

Figure 11:
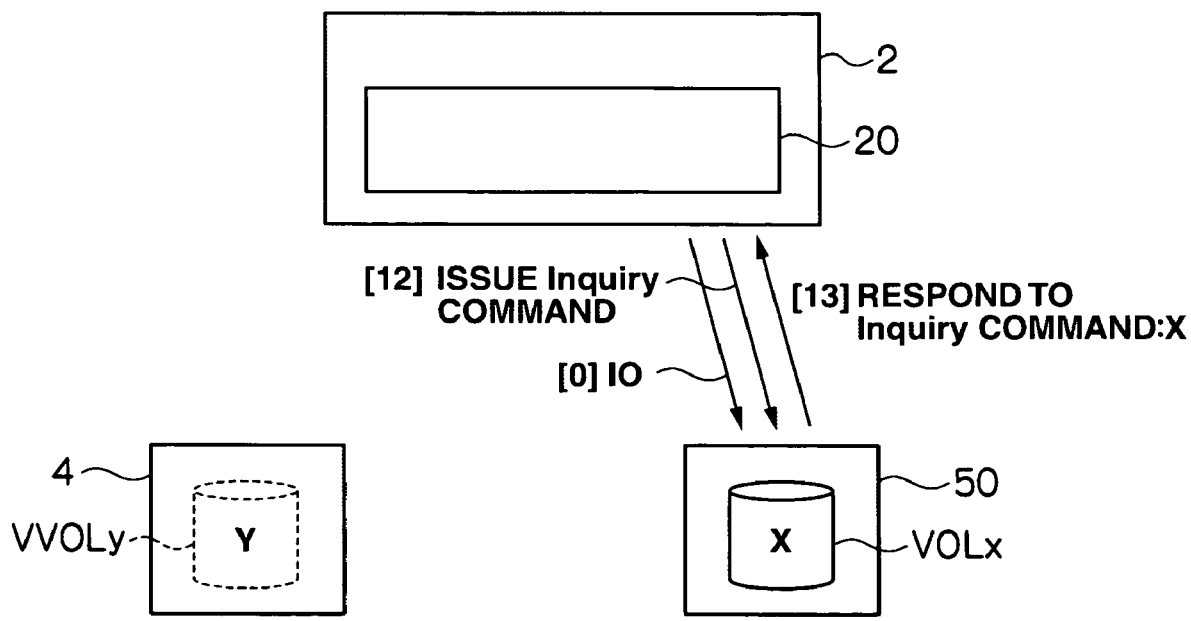
FIG. 11 is a diagram explaining the concept of the volume switching function according to Embodiment 1.

The host system 2 issues an inquiry command to the external storage apparatus 50 (SP12). This is shown in FIG. 11 ([12]).

Having received the inquiry command, the external storage apparatus 50 sends a response to the host system 2 (SP13). To be precise, as shown in FIG. 11, the external storage apparatus 50 sends, in response to the inquiry command, the volume information for the volume X VOLx, which is the external storage apparatus 50's own information, to the host system 2 ([13]). In the meantime, data read/write requests have been successively issued from the host system 2 to the volume X VOLx in the external storage apparatus 50 ([0]).

Based on the responses from the storage apparatus 4 and external storage apparatus 50, the host system 2 sets an alternate volume (SP14). In this case in Embodiment 1, because the host system 2 receives the volume information for the volume Y VVOLy and the volume information for the volume X VOLx from the storage apparatus 4, and it also receives the volume information for the volume X VOLx from the external storage apparatus 50, it judges that both storage apparatuses 4 and 50 store the same volume information for the volume X VOLx. The host system 2 also judges that the response from the storage apparatus 4 includes not only the volume information for the volume Y VVOLy but also the volume information for the volume X VOLx. Accordingly, it judges that the volume Y VVOLy can be an alternate volume for the volume X VOLx and so sets it as an alternate volume for the volume X VOLx as shown in FIG. 12.

After switching the access destination to the alternate volume, i.e., the volume Y VVOLy, the host system 2 issues data read/write requests to the volume Y VVOLy (SP15).

Figure 12:
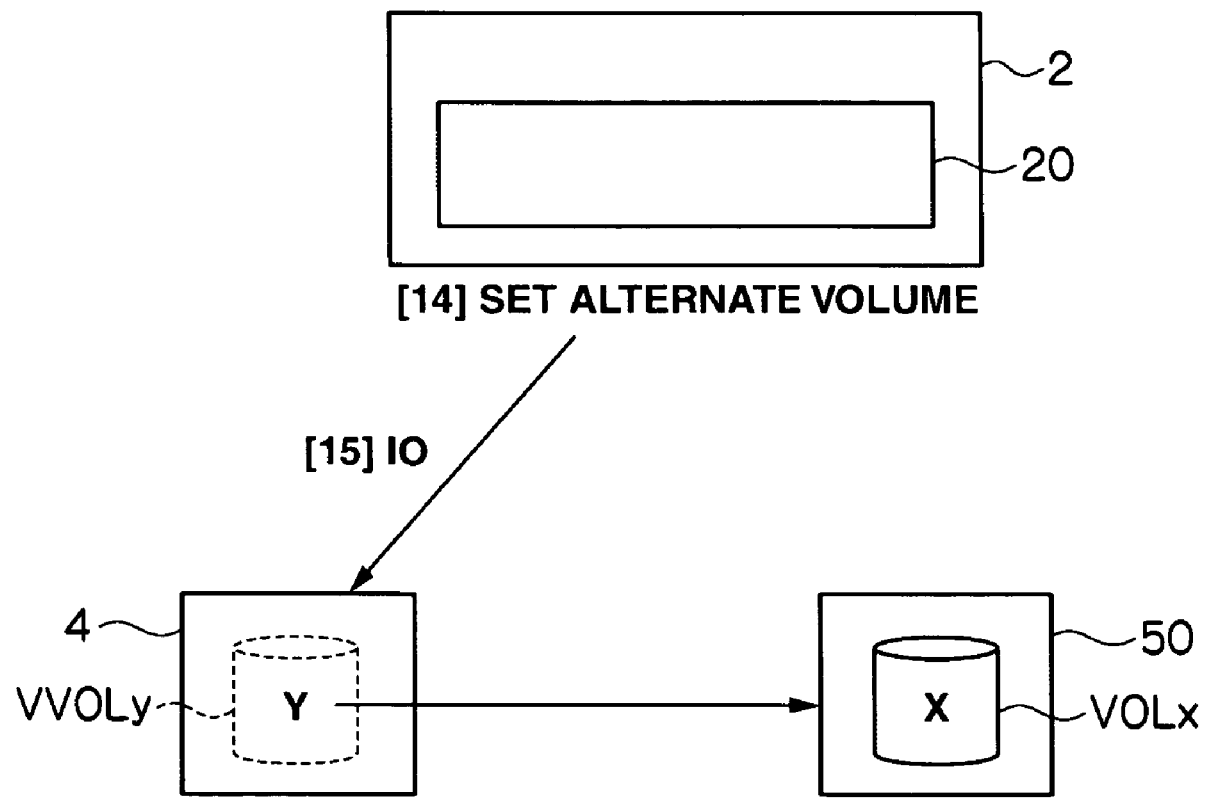
FIG. 12 is a diagram explaining the concept of the volume switching function according to Embodiment 1.

As shown in FIG. 12, a data read/write request from the host system 2 is actually sent to the volume X VOLx via the volume Y VVOLy ([15]). However, because the volume Y VVOLy is a virtual volume, the host system 2 considers itself to be accessing the volume X VOLx, which consequently means that the access destination has been migrated. Because data read/write requests are issued to the volume Y VVOLy, the host system 2 stops issuing data read/write requests to the volume X VOLx.

(1-4) Procedure to Set Volume Switching Function

The procedure to set the volume switching function between the host system 2 and storage apparatus 4 will now be explained.

(1-4-1) Procedure to Set Volume Switching Function in Host System

First, the procedure in which the host system 2 maps the same information as that in an external volume VOL0-n onto a virtual volume VVOL0-n and sets the virtual volume VVOL0-n as an alternate volume will be explained. Based on the host-side path switching program 20, the host system 2 executes volume switching function setting processing.

The volume switching function setting processing starts with the host system 2 issuing an inquiry command to the storage apparatus 4 to identify the unique volume information for the volume Y VVOLy (SP20).

The host system 2 then obtains the volume information for the volume Y VVOLy in the storage apparatus 4 based on the volume information table 71 and alternate volume information table 72 (SP21).

The host system 2 then judges whether the alternation mode, which is determined in accordance with the user input, is "ON" or not by referring to the alternate volume application list L3 where the obtained volume information for the volume Y VVOLy is stored (SP22).

If the host system 2 judges that the alternation mode is "ON" (SP22: Yes), it checks the alternate volume attribute based on the information stored in the "alternate volume attribute" field 72A in the alternate volume information table 72 (SP23).

Then, the host system 2 judges whether the alternate volume attribute is "ON" or not (SP24).

If the judgment is positive (SP24: Yes), the host system 2 obtains the volume information for the volume X VOLx from the volume information table 71 (SP25). It then issues an inquiry command to the external storage apparatus 50, receives a response containing the volume information for the volume X VOLx from the external storage apparatus 50, and searches for an alternate volume based on that information (SP26).

Because the host system 2 obtains the same volume information, i.e., the volume information for the volume X VOLx, from both the volume Y VVOLy in the storage apparatus 4 and from the volume X VOLx in the external storage apparatus 50, it sets the volume Y VVOLy as an alternate volume for the volume X VOLx (SP27).

The host system 2 then issues a data read/write request to the volume Y VVOLy (SP28).

After the host system 2 sets the alternate volume as above, it terminates the volume switching function setting processing (SP29).

Meanwhile, if the host system 2 judges that the alternation mode is OFF (SP22: No), it enters "OFF" in the "alternate volume attribute" field 72A in the alternate volume information table 72 (SP30) and terminates the volume switching function setting processing (SP29).

Also, if the host system 2 judges that "OFF" is entered in the "alternate volume attribute" field 72A in the alternate volume information table 72 (SP24: No), it enters "OFF" in the "alternate volume attribute" field 72A (SP30) and terminates the volume switching function setting processing (SP29).

Figure 13:
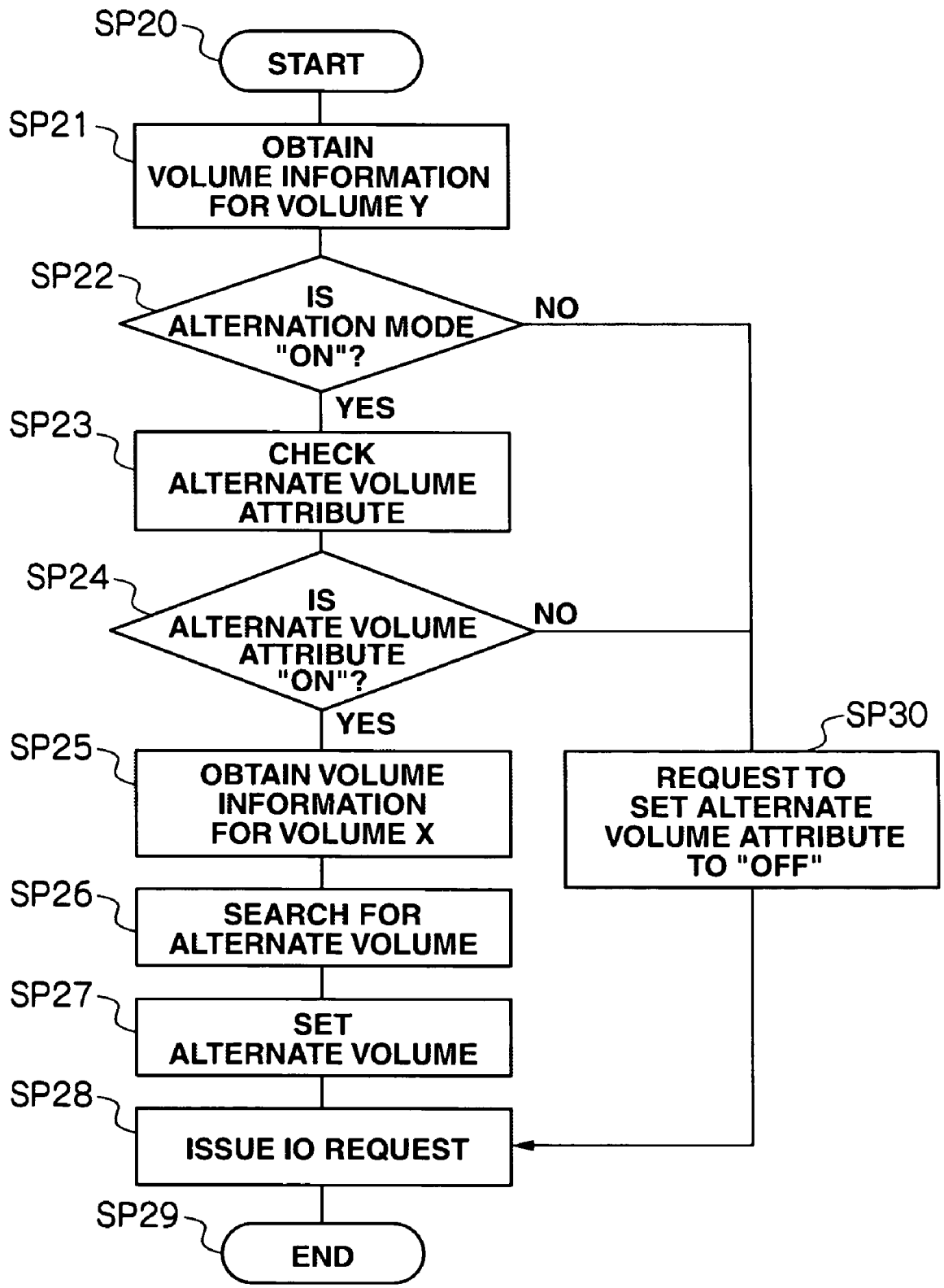
FIG. 13 is a flowchart explaining the volume switching function of a host system according to Embodiment 1.
Figure 14:
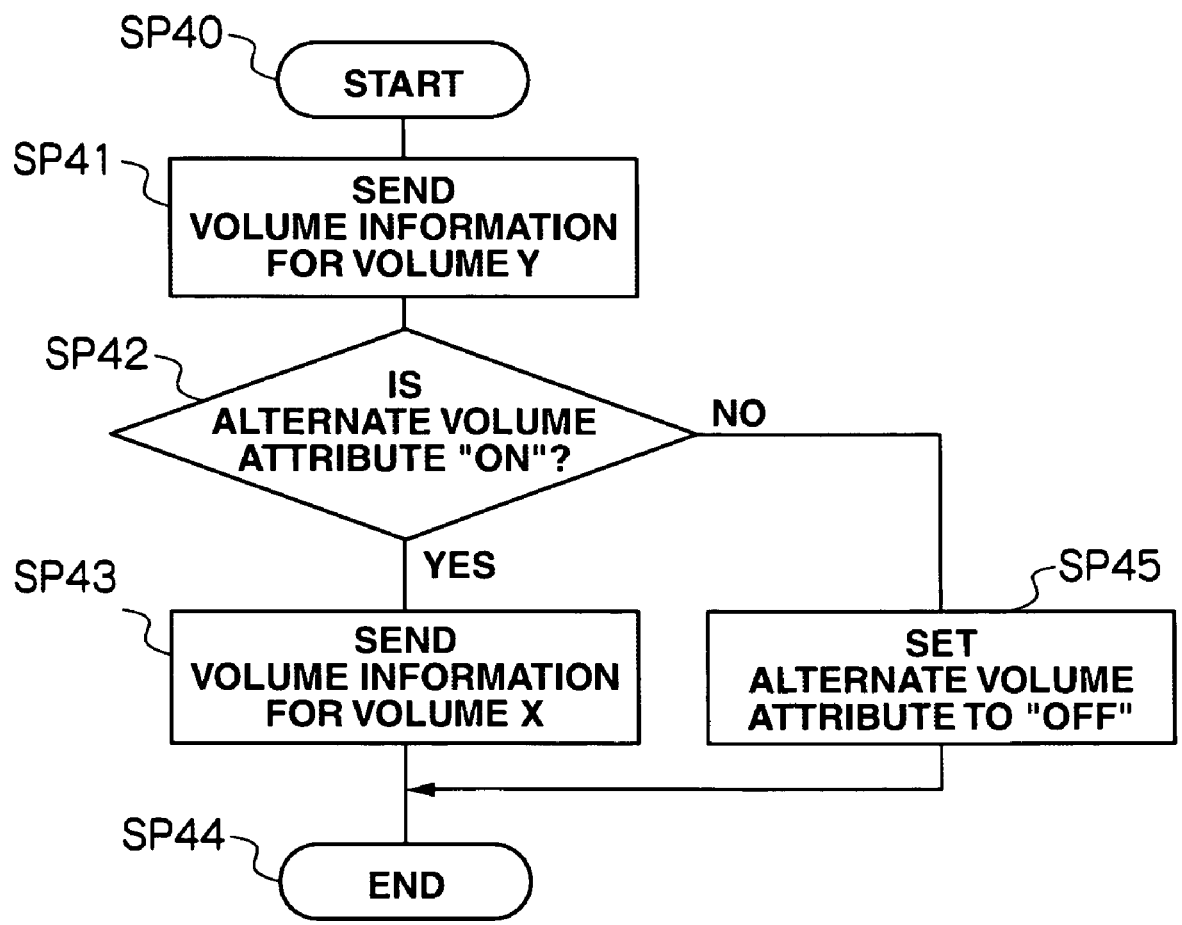
FIG. 14 is a flowchart explaining the volume switching function of a storage apparatus according to Embodiment 1.

Incidentally, the processing performed in steps SP20 to SP29 shown in FIG. 13 is the specific explanation of the processing performed in steps SP9 to SP14 in FIG. 4.

(1-4-2) Procedure to Set Volume Switching Function in Storage Apparatus

The volume switching function setting processing performed in the storage apparatus 4 side in parallel with the volume switching function setting processing performed in the host system 2 side will be explained next. The storage apparatus 4 executes the volume switching function setting processing based on a storage-side path switching program 70.

The storage-apparatus 4-side volume switching function setting processing starts with the storage apparatus 4 receiving, from the host system 2, an inquiry command to identify the unique volume information for the volume Y VVOLy (SP40).

The storage apparatus 4 then sends the volume information for the volume Y VVOLy to the host system 2 (SP41). In other words, the storage apparatus 4 sends the volume information for the volume Y VVOLy stored in the volume information table 71 and alternate volume information table 72 to the host system 2.

After sending the volume information for the volume Y VVOLy to the host system 2, the storage apparatus 4 checks the alternate volume attribute in the "alternate volume attribute" field 72A by referring to the alternate volume information table 72, and judges whether it is "ON" or not (SP42).

If the storage apparatus 4 judges that the alternate volume attribute is "ON" (SP42: Yes), it obtains from the volume information table 71 the volume information for the volume X VOLx and sends it to the host system 2 (SP43).

When a data read/write request is issued by the host system 2 to the volume Y VVOLy set as an alternate volume, the volume switching function setting processing terminates (SP44).

Meanwhile, if the storage apparatus 4 judges that the alternate volume attribute if "OFF," (SP42: No), it enters "OFF" in the "alternate volume attribute" field 72A in the alternate volume information table 72 (SP43) and terminates the volume switching function setting processing (SP44).

(1-5) Effects of Embodiment 1

According to Embodiment 1, because the migration of an access destination for the host system 2 to a new storage apparatus 4 is performed by migrating the access destination from a migration source substantial volume (VOLx) to a migration destination virtual volume (VVOLy), the host system 2 can migrate the access destination volume without having to suspend the transmission of data between the host system 2 and the storage apparatuses 4 and 50.

Moreover, because the migration of the access destination for the host system 2 between different types of storage apparatuses 4 and 50 is performed by mapping the same information as the information for a substantial volume (VOLx) onto a virtual volume (VVOLy) in the storage apparatus 4, it is unnecessary to change the micro program in the migration source external storage apparatus 50, and the change processing required for the migration can be performed smoothly.

(2) Embodiment 2

(2-1) Structure of Storage System in Embodiment 2

The storage system 200 according to Embodiment 2 will be explained below. In Embodiment 2, the same components as those in Embodiment 1 are given to the same reference numerals. Here, only the configurations different from those in Embodiment 1 are explained.

Figure 15:
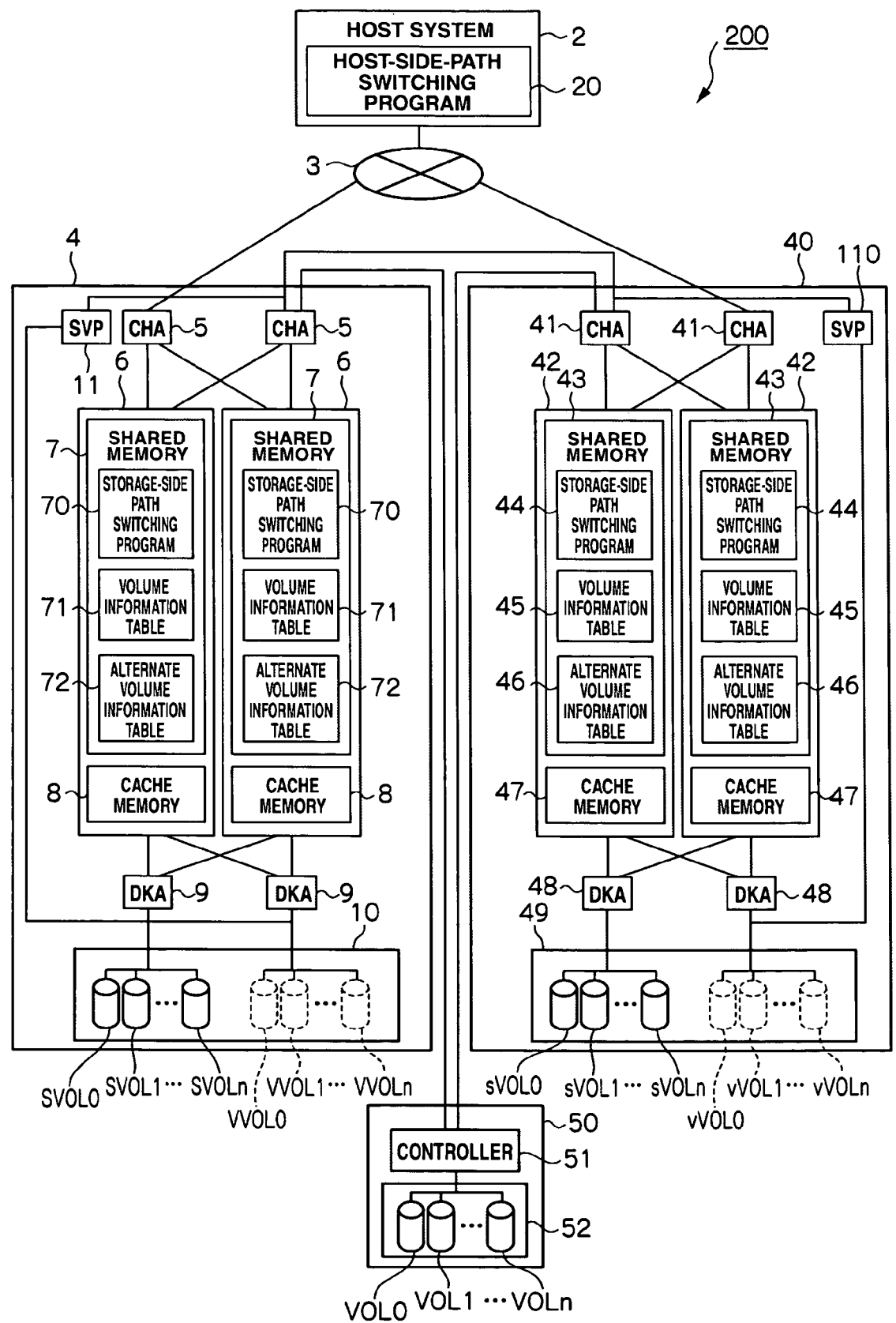
FIG. 15 is a block diagram showing the overall structure of a storage system according to Embodiment 2.

In FIG. 15, reference numeral 200 shows the overall storage system. In this system 200, the host system 2 is connected via the network 3 to the storage apparatus 4 (called "first storage apparatus 4" in this embodiment), which is the same as the one explained in Embodiment 1, and also to a second storage apparatus 40, and both the first and second storage apparatuses 4 and 40 are connected to the external storage apparatus 50.

Incidentally, in the explanation of Embodiment 2, first substantial volumes SVOL0-n and first virtual volumes VVOL0-n correspond to the substantial volumes SVOL0-n and virtual volumes VVOL0-n in Embodiment 1.

The second storage apparatus 40 is composed of: a plurality of channel adapters 41; a plurality of memory units 42; a plurality of disk adapters 48; a hard disk drive unit 49; and a service processor 110. Transmission of data and commands between the channel adapters 41, memory units 42 and disk adapters 48 is conducted via a bus or switch, such as an ultrahigh-speed crossbar switch, which transmits data by high-speed switching.

The channel adapters 41, memory units 42, disk adapters 48 and service processor 110 in the second storage apparatus 40 are structured the same as the channel adapters 5, memory units 6, disk adapters 9 and service processor 11 explained in Embodiment 1, so their explanations will be omitted.

The hard disk drive unit 49 is composed of a plurality of hard disk drives (not shown in the drawing), for example, expensive hard disk drives such as SCSI (Small Computer System Interface) disks or inexpensive hard disk drives such as SATA (Serial AT Attachment) disks.

These hard disk drives provide storage areas, for which one or more logical volumes are defined.

Examples of attributes of the logical volumes created in the second storage apparatus 40 include second substantial volumes sVOL0-n and second virtual volumes vVOL0-n. The second substantial volumes sVOL0-n are the logical volumes assigned with storage areas and data can actually be input/output to/from them. The second virtual volumes VVOL0-n are the virtual logical volumes that do not physically exist.

Incidentally, the second substantial volumes sVOL0-n and second virtual volumes VVOL0-n are structured the same as the first substantial volumes SVOL0-n and first virtual volumes VVOL0-n so their explanations will be omitted.

In the storage system 200 structured as above, when the host system 2 issues a data read/write request, data read/write is performed with the following procedure. When the host system 2 requests data write, for example, it sends write target data to the external storage apparatus 50 via the channel adapter 5 in the first storage apparatus 4 or the channel adapter 41 in the second storage apparatus 40. After the controller 51 in the external storage apparatus 50 receives that data, it is written in the external volume(s) VOL0-n.

Meanwhile, when the host system 2 requests data read, the read target data stored in an external volume VOL0-n is read, and when the controller 51 receives that data, it sends it to the first storage apparatus 4 or second storage apparatus 40. Then, the host system 2 receives the data via the channel adapter 5 in the first storage apparatus 4 or the channel adapter 41 in the second storage apparatus 40.

(2-2) Volume Switching Function

The volume switching function employed in the storage system 200 according to Embodiment 2 will be explained next.

This storage system 200 is characterized in that the migration of a volume the host system 2 recognizes is performed by mapping the same information as the volume information for an external volume VOL0-n onto a first virtual volume VVOL0-n in the first storage apparatus 4 or second virtual volume vVOI0-n in the second storage apparatus 40, and setting that virtual volume as an alternate volume.

In addition, Embodiment 2 is characterized in that a first virtual volume VVOL0-n and second virtual volume VVOL0-n are set as alternate volumes and the host system 2 distributes to-be-issued-data read/write requests between these virtual volumes by means of alternate paths; consequently, the virtual volumes in the storage apparatuses can be clustered.

Here, alternate paths are redundancy paths for issuing data read/write requests from the host system 2.

Clustering is optimizing the loads on virtual volumes and providing redundancies between the virtual volumes by the host system 2 distributing data transmission tasks between the virtual volumes.

In order to realize such an volume switching function, the shared memory 7 in the first storage apparatus 4 and the shared memory 43 in the second storage apparatus 40 are needed. The storage-side path switching program 70, volume information table 71, and alternate volume information table 72 stored in the shared memory 7 are already explained in Embodiment 1, so their explanations will be omitted.

A storage-side path switching program 44, volume information table 45, and alternate volume information table 46 stored in the shared memory 43 in the second storage apparatus 40 are structured the same as the storage-side path switching program 70, volume information table 71 and alternate volume information table 72 stored in the shared memory 7 in Embodiment 1, so their explanations will be omitted.

(2-3) Procedure to Work Volume Switching Function

The procedure to work the volume switching function will now be explained with reference to the foregoing tables.

Figure 16:
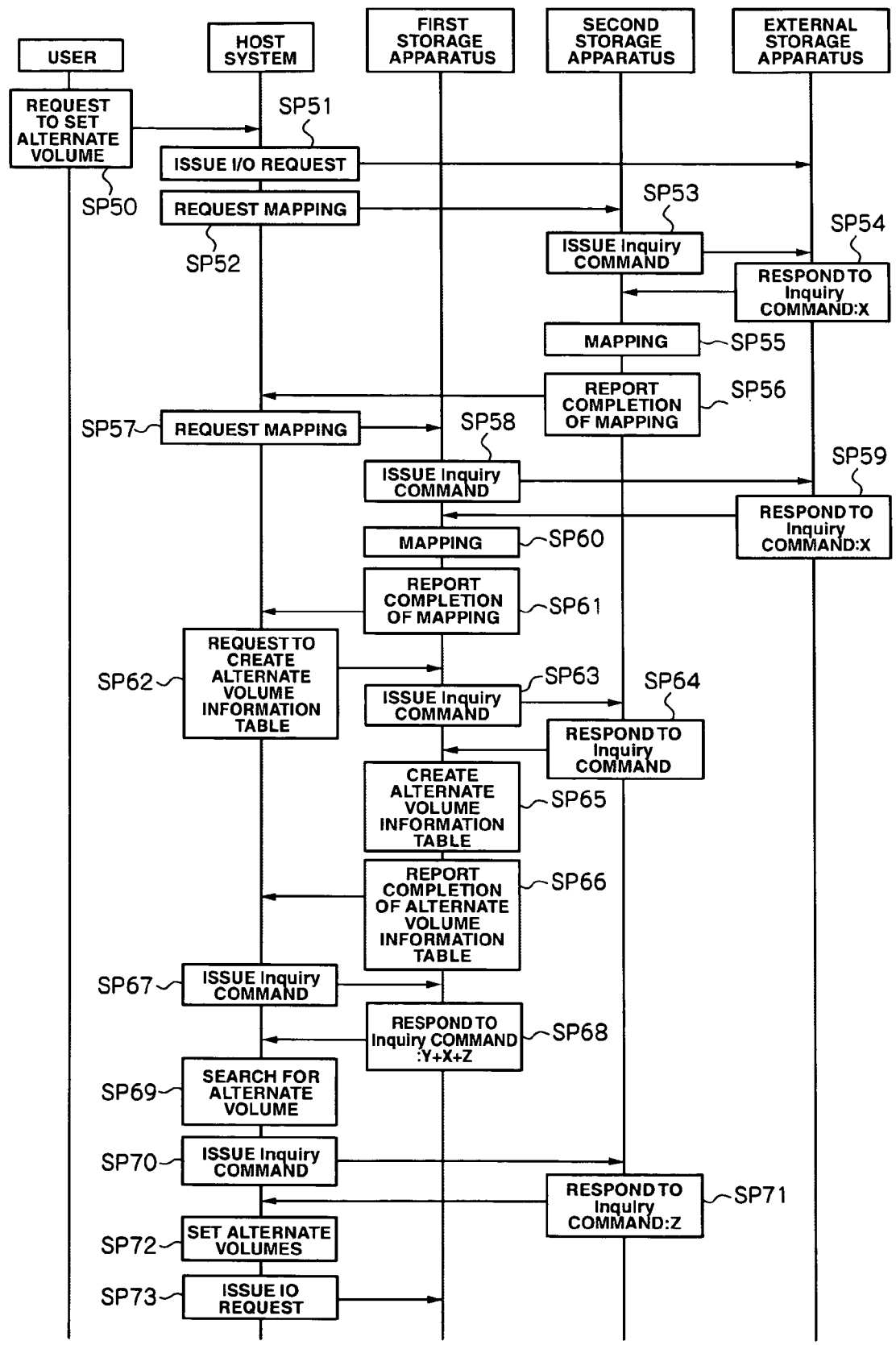
FIG. 16 shows a sequence explaining the volume switching function according to Embodiment 2.

As shown in FIG. 16, with the storage system 200, the user inputs an order to set alternate volume(s) (SP50).

When the user completes the input of an order to set alternate volume(s), the host system 2 issues a data read/write request to the external storage apparatus 50 designating one of the external volumes VOL0-n, e.g., the volume X VOLx (SP51) and sends a mapping request to the second storage apparatus 40 (SP52).

Figure 17:
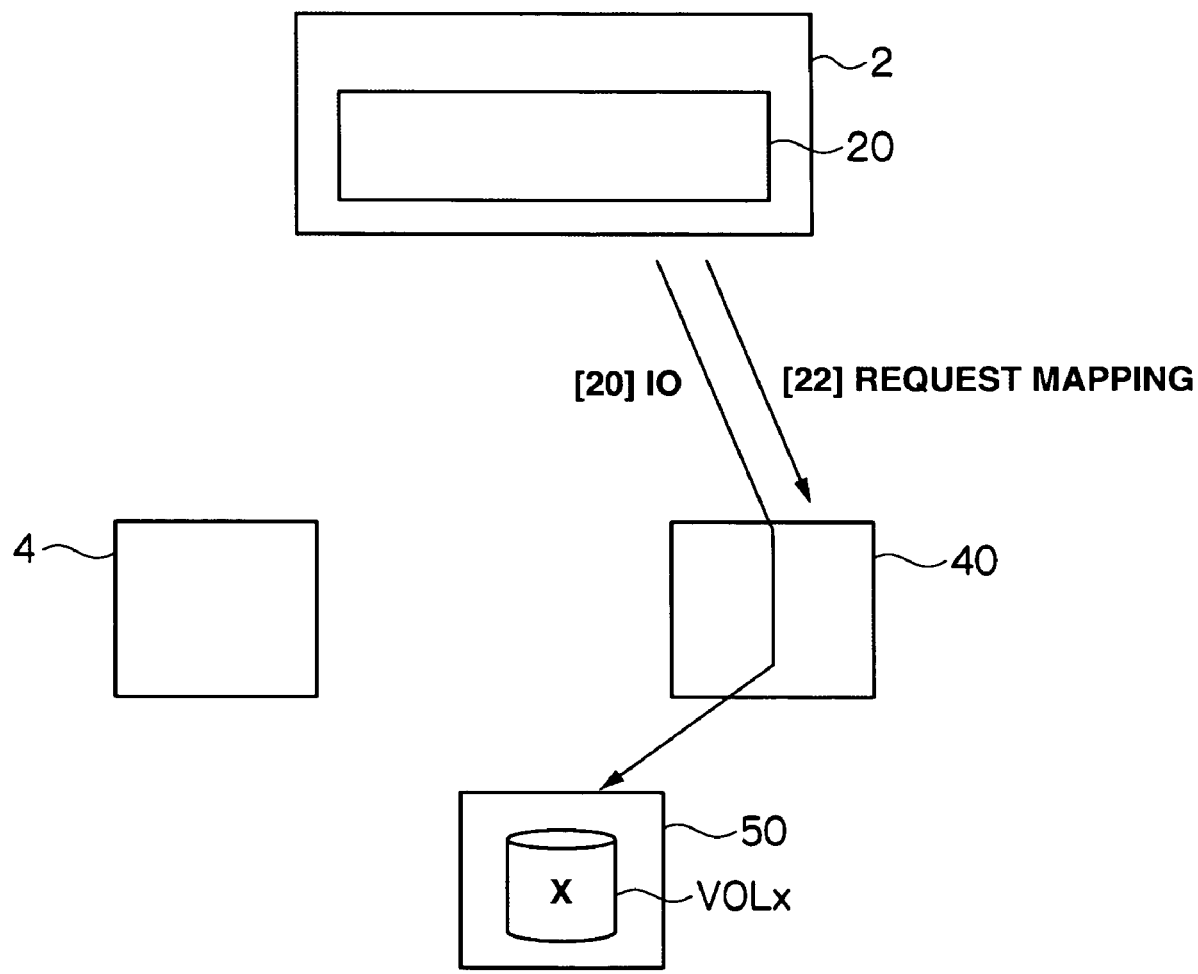
FIG. 17 is a diagram explaining the concept of the volume switching function according to Embodiment 2.

For example, as shown in FIG. 17, it is assumed that while the host system 2 issues the data read/write request to the volume X VOLx in the external storage apparatus 50, the user inputs an order in the host system 2 to set alternate volumes in the first storage apparatus 4 and second storage apparatus 40 ([20], [21]).

As shown in FIG. 17, it is also assumed that, for example, the host system 2 makes a request to the second storage apparatus 40 to map the volume information for the volume X VOLx in the external storage apparatus 50 onto a volume in the second storage apparatus 40 ([22]). In other words, it is a request to set the volume X VOLx in the external storage apparatus 50 as a migration source volume and a second virtual volume in the second storage apparatus 40 as a migration destination volume.

Figure 18:
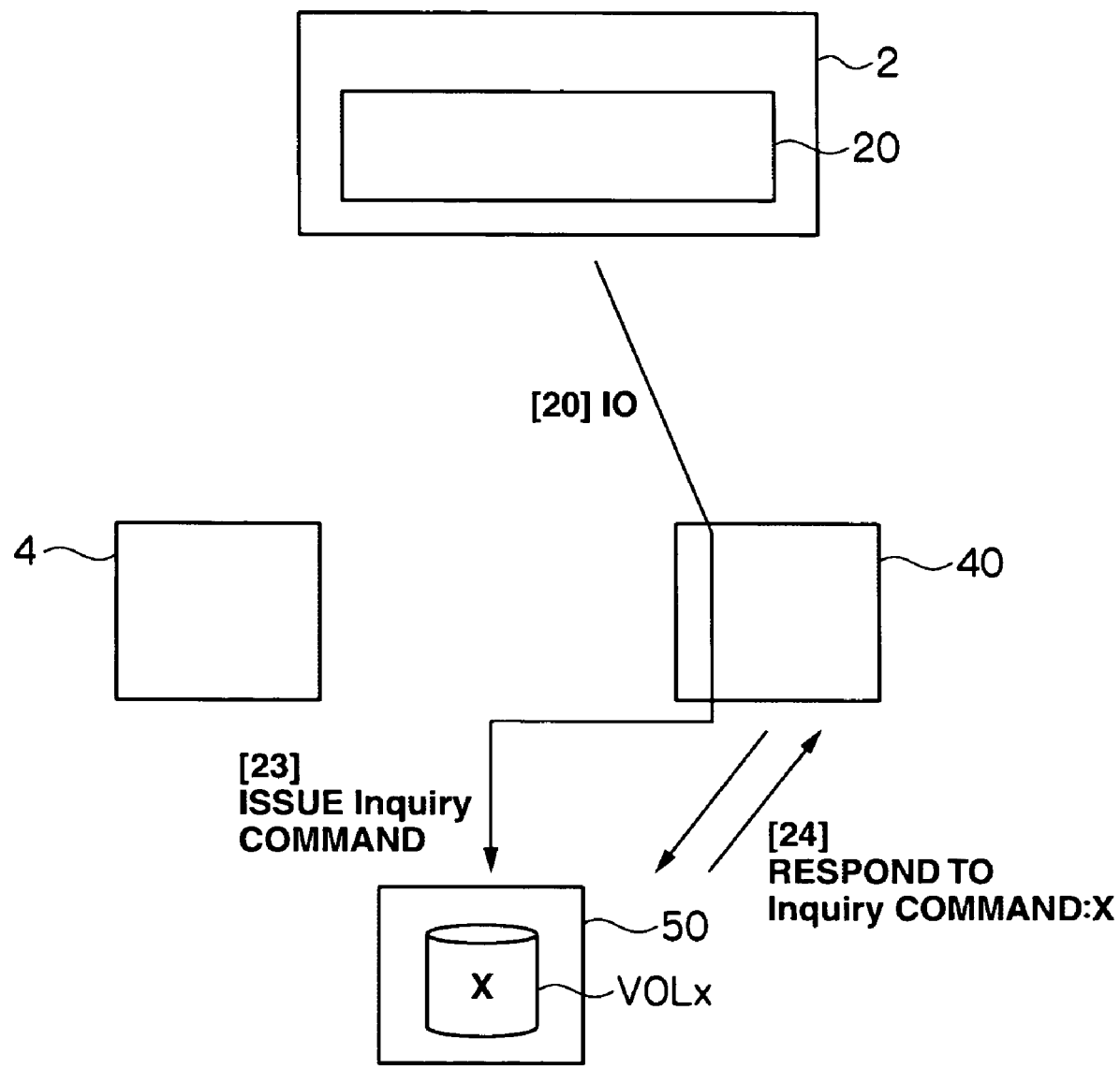
FIG. 18 is a diagram explaining the concept of the volume switching function according to Embodiment 2.

Having received this mapping request, the second storage apparatus 40 issues an inquiry command to the external storage apparatus 50 (SP53). To be precise, as shown in FIG. 18, the second storage apparatus 40 issues a command to the external storage apparatus 50, requesting that the volume information for the volume X VOLx in the external storage apparatus 50 be sent to the second storage apparatus 40 ([23]).

Having received the inquiry command, the external storage apparatus 50 sends a response to the second storage apparatus 40 (SP54). To be precise, as shown in FIG. 18, it sends the volume information for the volume X VOLx to the second storage apparatus 40 ([24]).

Figure 19:
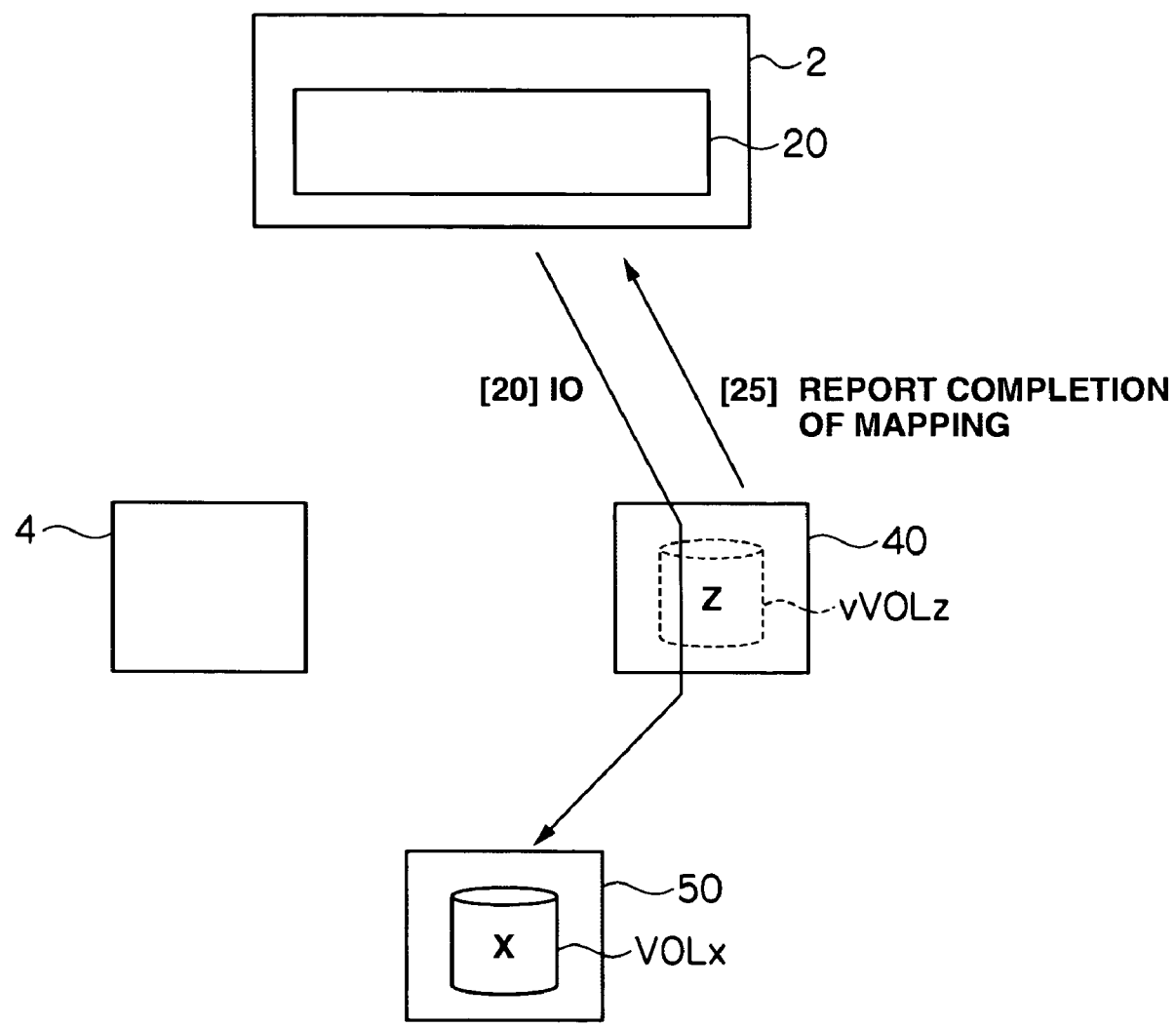
FIG. 19 is a diagram explaining the concept of the volume switching function according to Embodiment 2.

The second storage apparatus 40 then maps the volume information for the volume X VOLx onto a virtual volume in the volume information table 45 (SP55). As shown in FIG. 19, the second storage apparatus 40 maps that volume information onto the virtual volume "Z" ("volume Z") from among the second virtual volumes vVOL0-n. Thus, in the shared memory 43 in the second storage apparatus 40, the volume information table 45 previously storing the information for the volume Z vVOLz is updated with the newly-added volume information for the volume X VOLx.

When this volume information table 45 is updated as above, the second storage apparatus 40 notifies the host system 2 of the completion of mapping (SP56). This is shown in FIG. 19 ([25]). In the meantime, data read/write requests have been successively issued from the host system 2 to the volume X VOLx in the external storage apparatus 50 ([20]).

Figure 20:
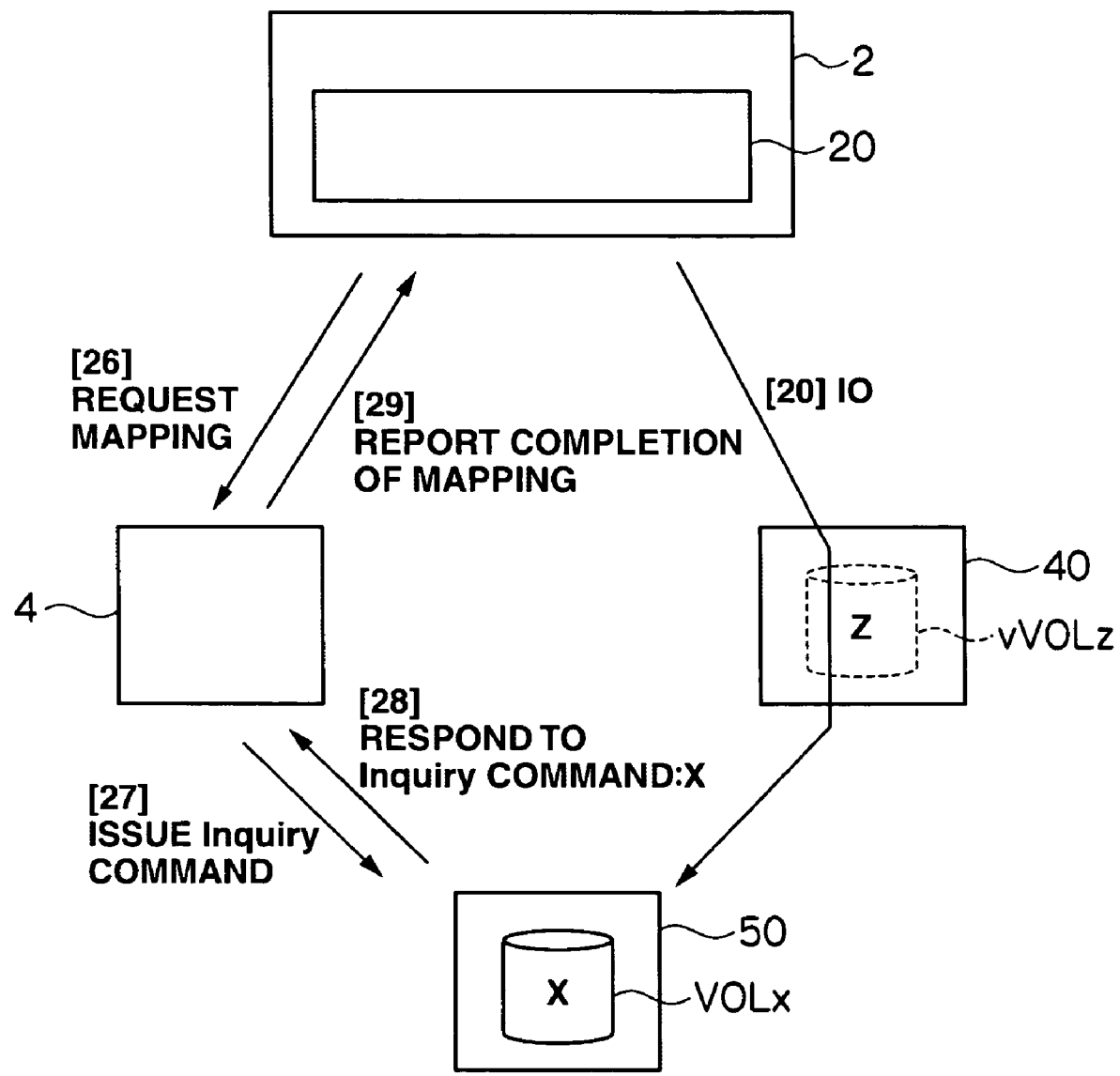
FIG. 20 is a diagram explaining the concept of the volume switching function according to Embodiment 2.

Likewise, the host system 2 also sends a mapping request to the first storage apparatus 4 (SP57) designating the volume Y VVOLy, carries out steps SP58 to SP61, which are the same as SP53 to SP56, and maps the volume information for the volume X VOLx onto the volume Y VVOLy. This is shown in FIG. 20 ([26]-[29]).

Figure 21:
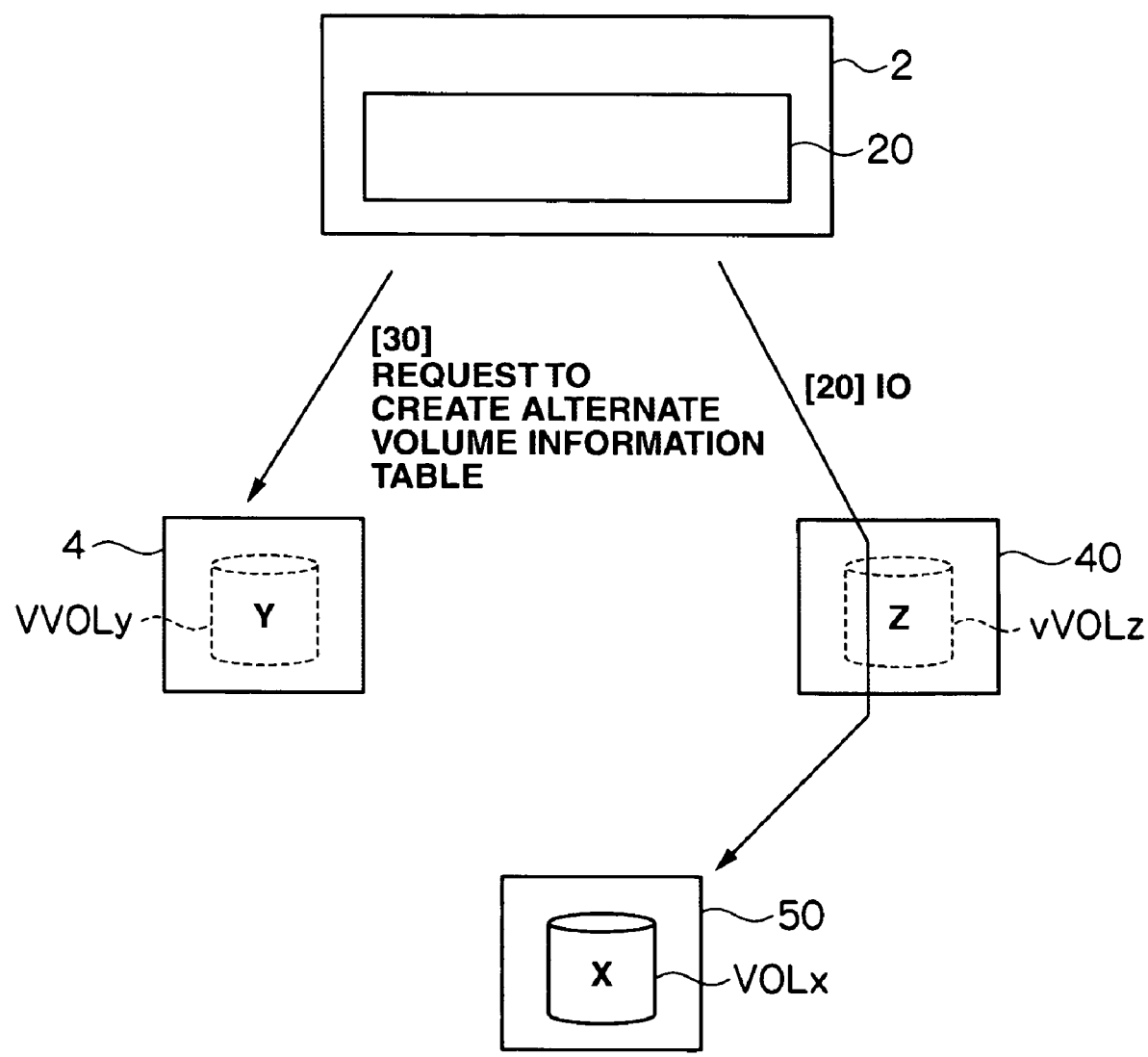
FIG. 21 is a diagram explaining the concept of the volume switching function according to Embodiment 2.

Having received a completion notice, the host system 2 sends a request to create an alternate volume information table 72 to the first storage apparatus 4 (SP62). This is shown in FIG. 21 ([30]).

Figure 22:
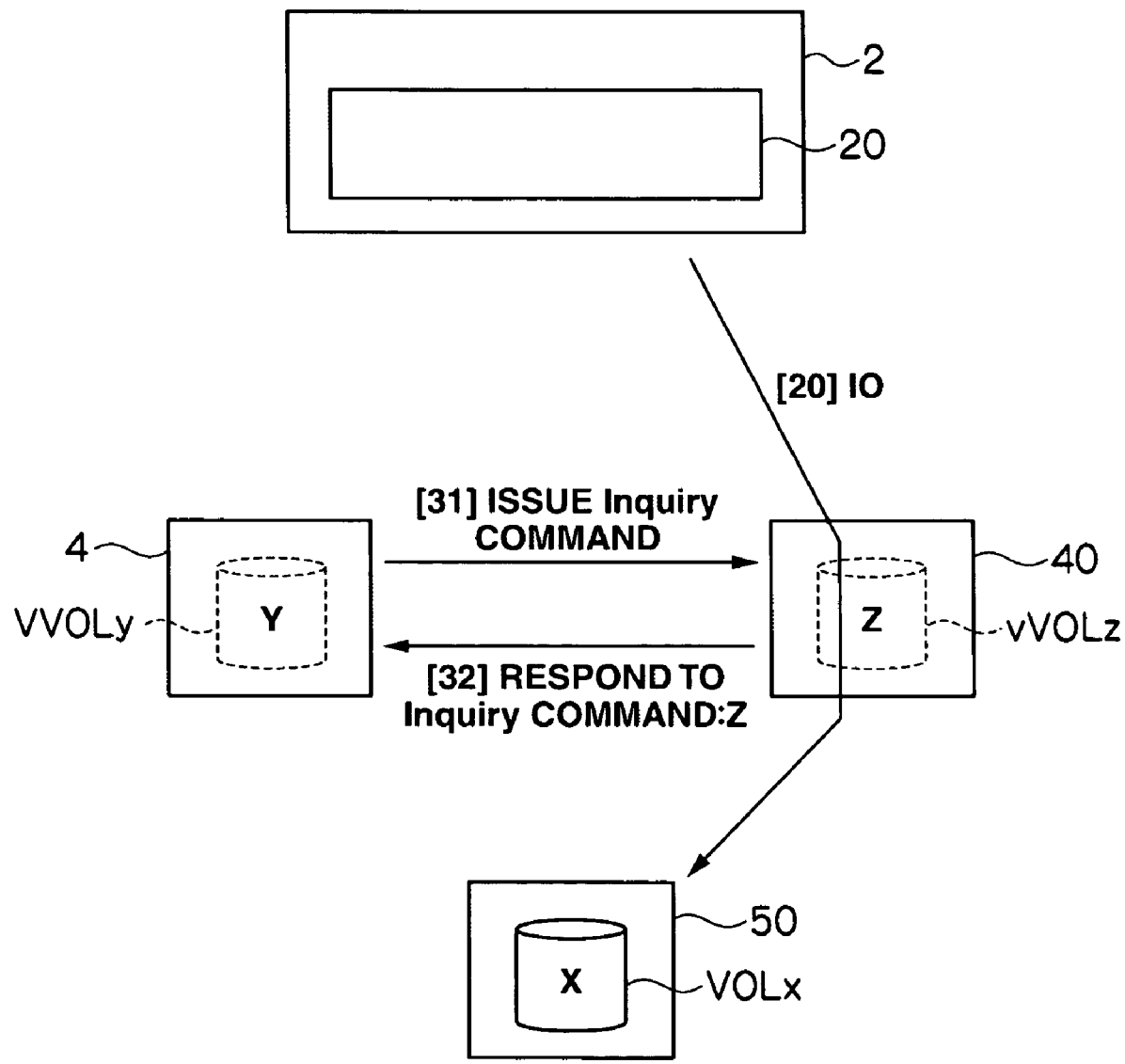
FIG. 22 is a diagram explaining the concept of the volume switching function according to Embodiment 2.

Then, the first storage apparatus 4 sends an inquiry command to the second storage apparatus 40 requesting that the volume information for the volume Z vVOLz be sent (SP63). Having received this inquiry command, the second storage apparatus 40 responds to the first storage apparatus 4 by sending the volume information for the volume Z vVOLz (SP64). This is shown in FIG. 22 ([31], [32]).

Figure 23:
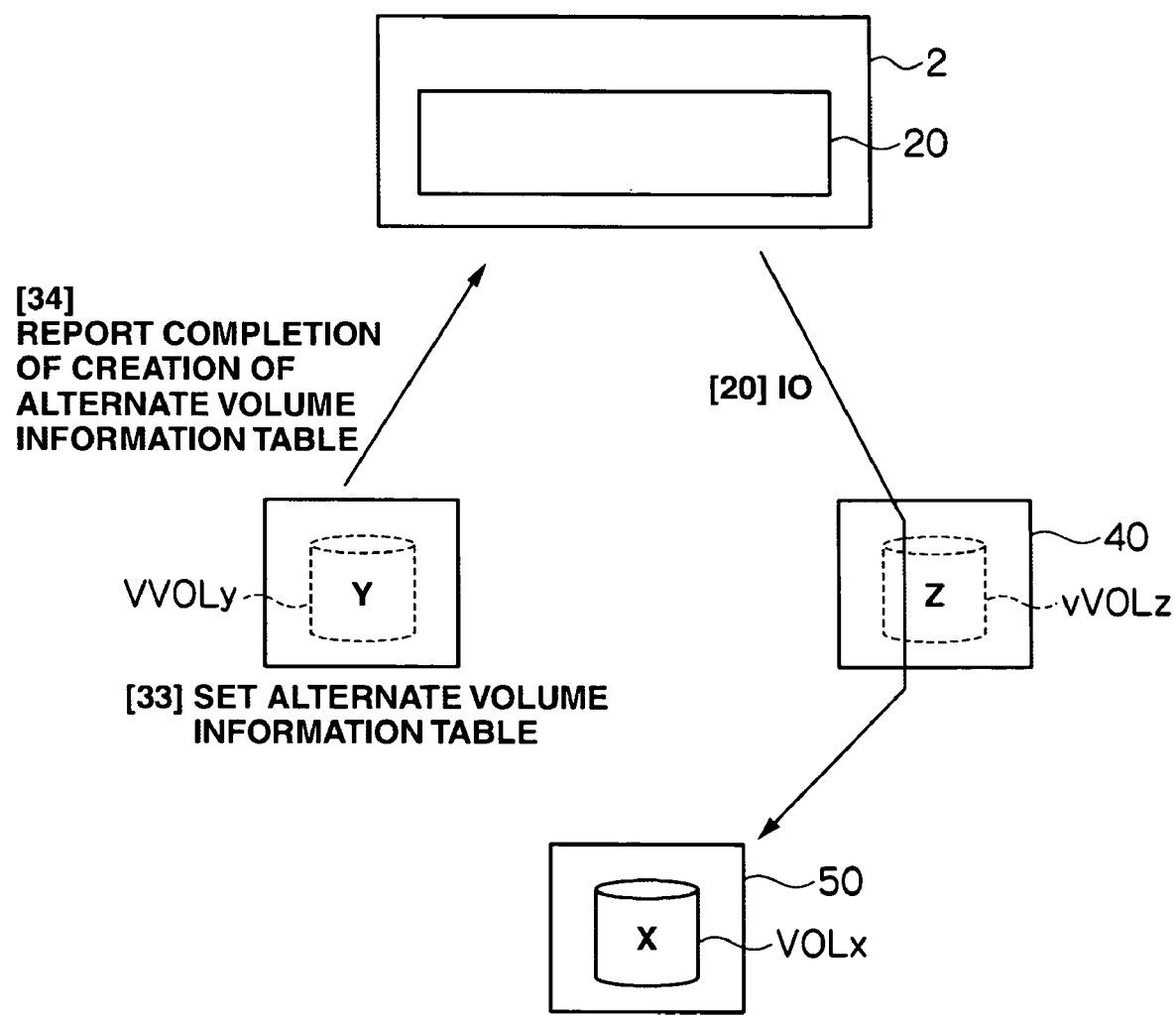
FIG. 23 is a diagram explaining the concept of the volume switching function according to Embodiment 2.

The first storage apparatus 4 then creates an alternate volume information table 72 (SP65). As shown in FIG. 23, the storage apparatus 4 maps the volume information for the volume X VOLx and volume Z vVOLz onto the volume Y VVOLy already storing its own volume information ([33]). in the table. In the meantime, data read/write requests have been successively issued from the host system 2 to the volume X VOLx in the external storage apparatus 50 ([20]).

After the first storage apparatus 4 completes the creation of the alternate volume information table 72, it notifies the host system 2 of the completion (SP66). This is shown in FIG. 23 ([34]). In the meantime, data read/write requests have been successively issued from the host system 2 to the volume X VOLx in the external storage apparatus 50 ([20]).

Figure 24:
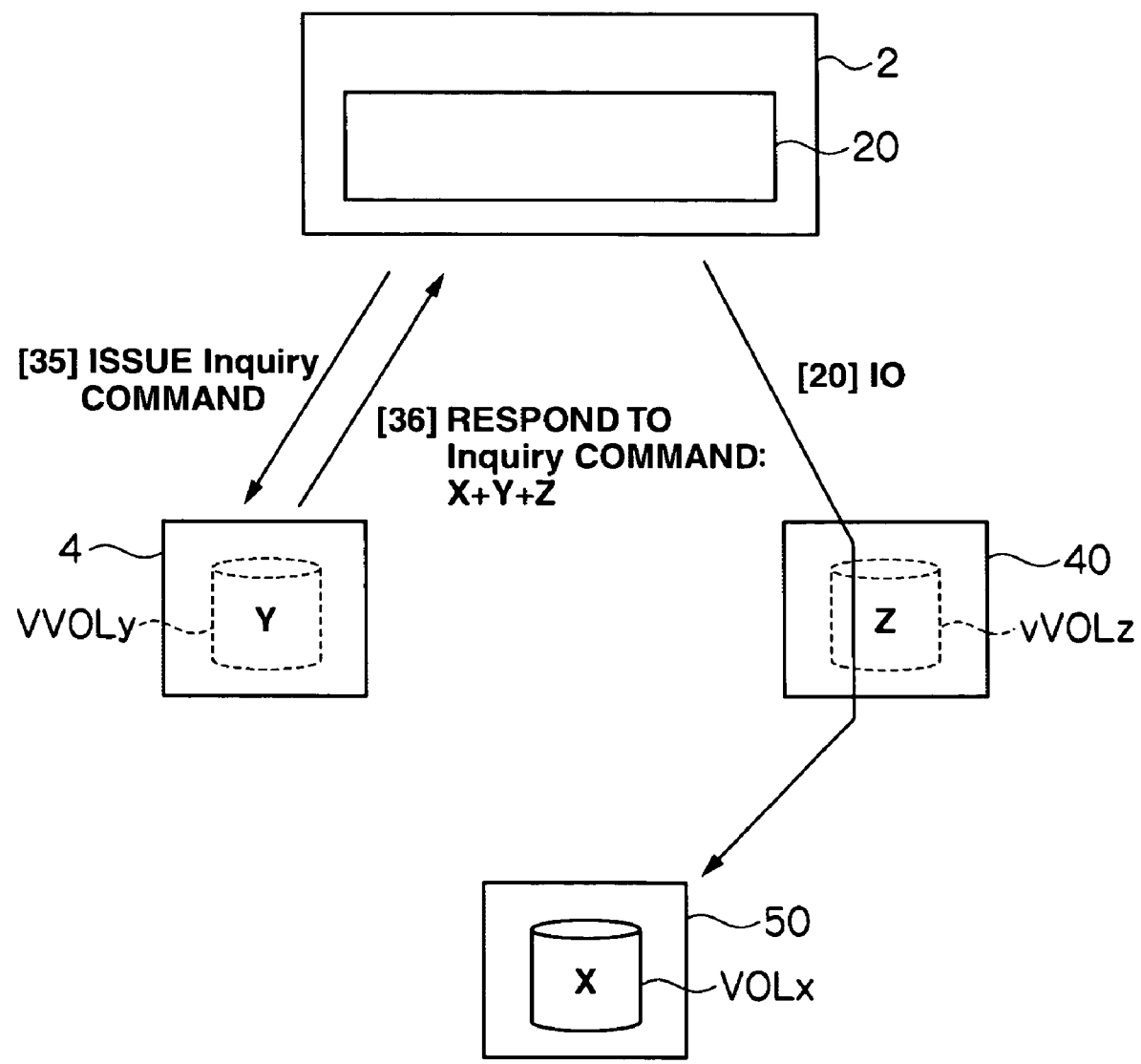
FIG. 24 is a diagram explaining the concept of the volume switching function according to Embodiment 2.

The host system 2 then issues an inquiry command to the first storage apparatus 4 (SP67). This is shown in FIG. 24 ([35]).

Having received the inquiry command, the first storage apparatus 4 sends a response to the host system 2 (SP68). To be precise, as shown in FIG. 24, the first storage apparatus 4 sends, as a response to that inquiry command, the volume information for its own volume Y VVOLy, volume information for volume X VOLx mapped to the volume Y VVOLy, and volume information for the volume Z vVOLz obtained from the second storage apparatus 40, to the host system 2 ([36]). In the meantime, data read/write requests have been successively issued from the host system 2 to the volume X VOLx in the external storage apparatus 50 ([20]).

Figure 25:
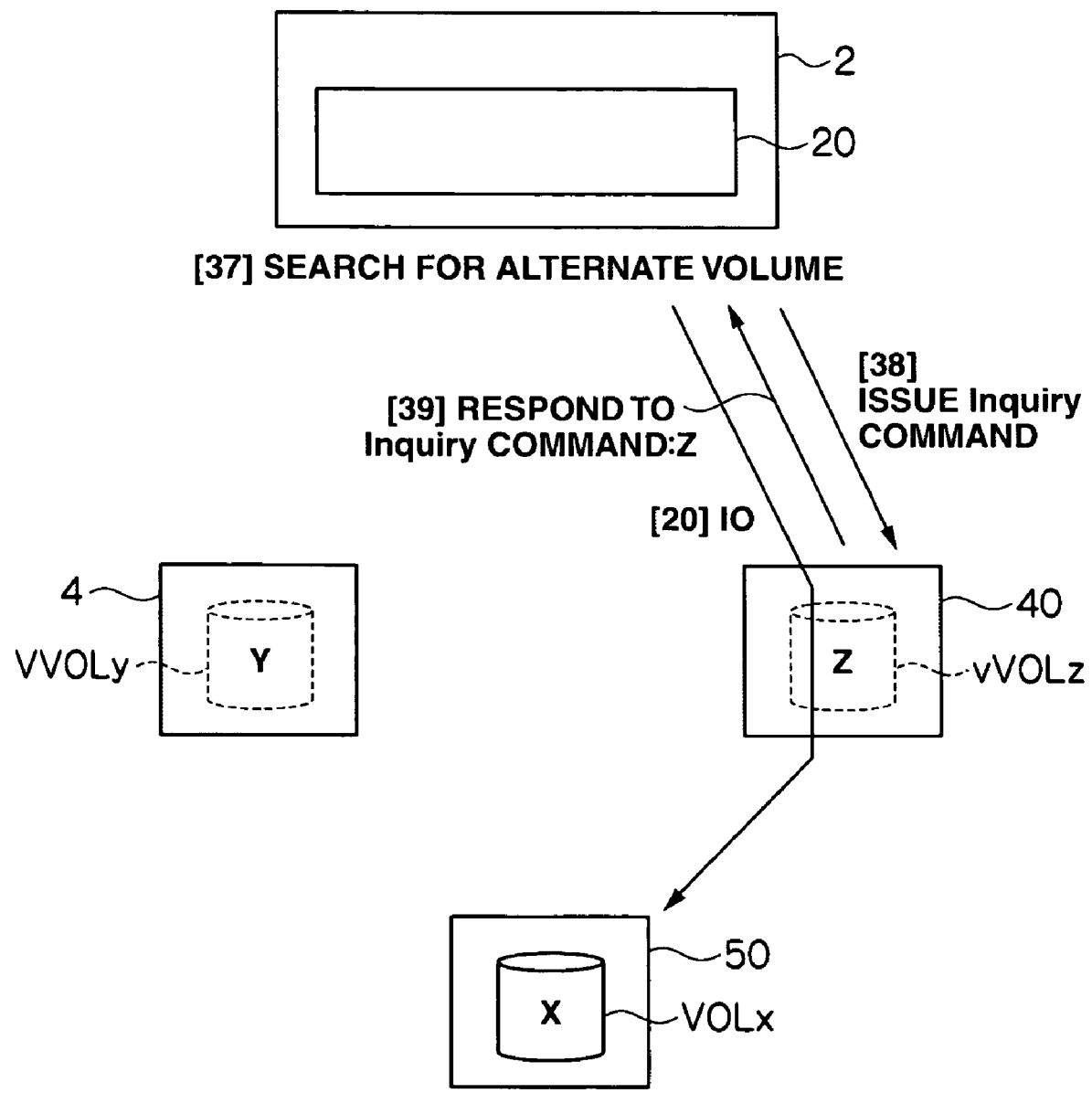
FIG. 25 is a diagram explaining the concept of the volume switching function according to Embodiment 2.

After checking that "ON" is entered in the "alternate volume attribute" field 72A in the alternate volume information table 72, the host system 2 searches for an alternate volume based on the volume information for the volume Y VVOLy, volume information for the volume X VOLx, and volume information for the volume Z vVOLz obtained in response to the inquiry command (SP69). In other words, the host system 2 issues an inquiry command to the second storage apparatus 40 (SP70). Having received this inquiry command, the second storage apparatus 40 sends a response to the host system 2 (SP71). To be precise, the second storage apparatus 40 sends the volume information for the volume Z vVOLz having the volume information for the volume X VOLx mapped thereto, to the host system 2. This is shown in FIG. 25 ([37]-[39]). In the meantime, data read/write requests have been successively issued from the host system 2 to the volume X VOLx in the external storage apparatus 50 ([20]).

Figure 26:
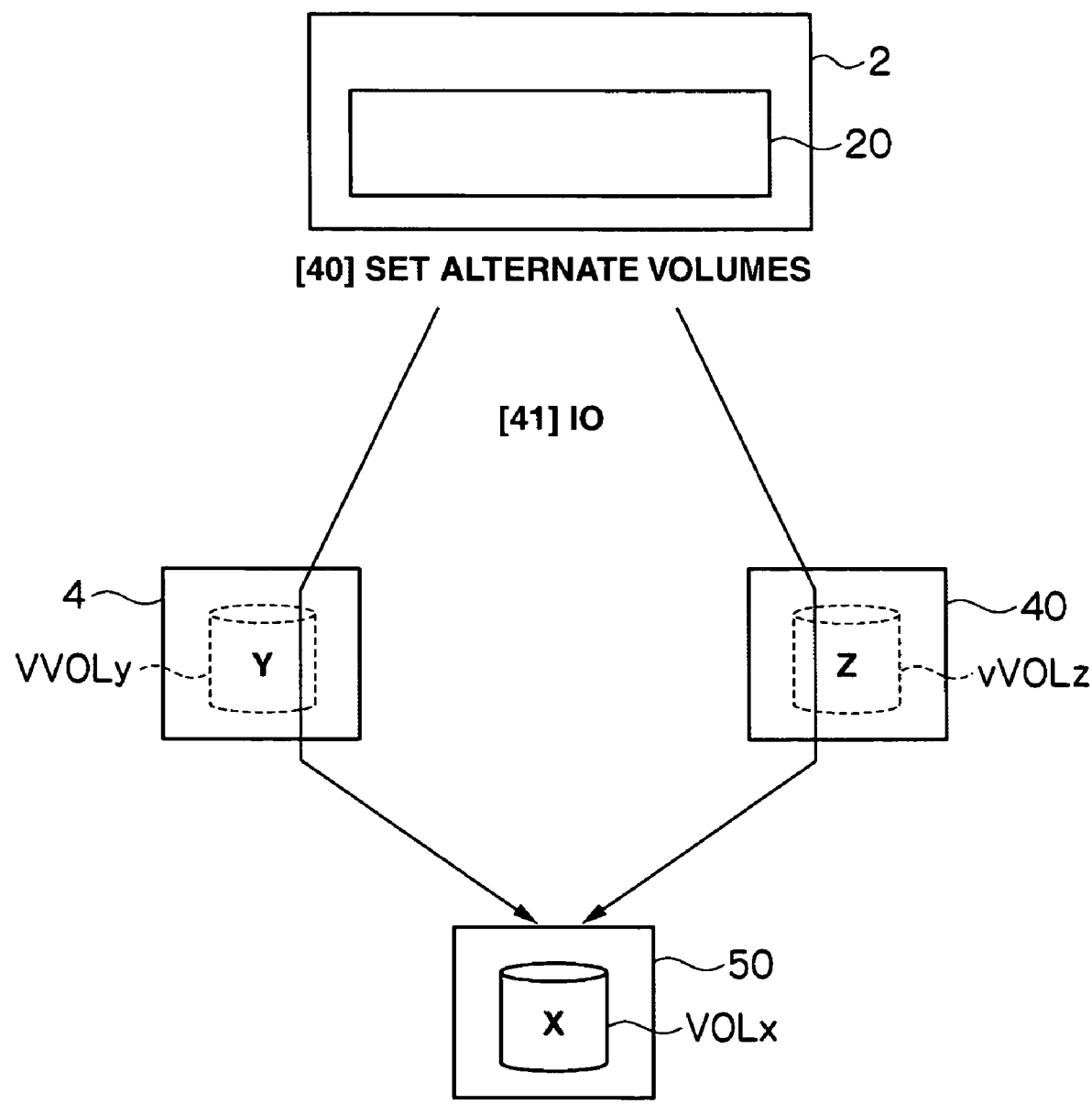
FIG. 26 is a diagram explaining the concept of the volume switching function according to Embodiment 2.

Based on the responses from the first storage apparatus 4 and second storage apparatus 40, the host system 2 sets alternate volumes (SP72). In Embodiment 2, because the host system 2 receives the volume information for the volume Y VVOLy, volume information for the volume X VOLx and volume information for the volume Z vVOLz from the first storage apparatus 4, and it also receives the volume information for the volume Z vVOLz from the second storage apparatus 40, it judges that both the storage apparatuses 4 and 40 store the same volume information, i.e., the volume information for the volume Z vVOLz. Then, as shown in FIG. 26, the host system 2 sets the volume Y VVOLy and volume Z vVOLz, both having the volume information for the volume X VOLx mapped thereto, as alternate volumes for the volume X VOLx ([40]).

After setting the alternate volumes, the host system 2 selects a data-read/write-request issue destination between the volume Y VVOLy and volume Z vVOLz, and sets an alternate path correspondingly and issues a data read/write request to the volume Y VVOLy or volume Z vVOLz (SP73).

Setting this alternate path by the host system 2 is to select either one of the volumes in light of the loads on the volumes and to distribute to-be-issued data read/write requests between them. Because the volume Y VVOLy and volume Z vVOIz are the alternate volumes for the volume X VOLx as shown in FIG. 26, the data read/write request from the host system 2 is issued to the volume X VOLx via the volume Y VVOLy or volume Z vVOLz ([41]).

(2-4) Effects of Embodiment 2

According to Embodiment 2, because the migration of an access destination for the host system 2 to the first storage apparatus 4 or second storage apparatus 40 is performed by migrating the access destination from a migration source substantial volume (VOLx) to any of the virtual volume(s) in the migration destination(s) (VVOLy, VVOLz), it is possible to migrate the access destination volume without having to suspend the transmission of data between the host system 2 and storage apparatuses 4, 40 and 50.

Moreover, because the migration of the access destination for the host system 2 between the different types storage apparatuses 4, 40 and 50 is performed by mapping the same information as the volume information for a substantial volume (VOLx) onto virtual volumes (VVOLy, VVOLz) in the first storage apparatus 4 and second storage apparatus 40, it is unnecessary to change the micro program in the migration source external storage apparatus 50, and the change processing required for the migration can be performed smoothly.

Furthermore, according to Embodiment 2, because virtual volumes VVOLy, VVOLz are set as alternate volumes and the host system 2 distributes data transmission tasks between the virtual volumes, the virtual volumes in the storage apparatuses can be clustered and the data sent to the respective volumes can be consistent.

(3) Embodiment 3

(3-1) Structure of Storage System in Embodiment 3

The storage system 300 according to Embodiment 3 is explained below. In this embodiment, the same components as those in Embodiments 1 and 2 are given the same reference numerals. Only configurations different from those in Embodiment 2 will be explained.

In the storage system 300 according to Embodiment 3, in addition to the storage apparatuses included in the storage system 200 in Embodiment 2, a different-type of storage apparatus, i.e., a third storage apparatus 60 is also connected to the first storage apparatus 4 and external storage apparatus 50.

Hard disk drives (not shown in the drawing) in the third storage apparatus 60 provide storage areas, for which a plurality of logical volumes (not shown in the drawing) are set. One of the attributes of the logical volumes is a virtual volume (not shown in the drawing). A virtual volume is a virtual logical volume that does not exist physically. It is assumed that, one of the virtual volumes named "U" ("volume U") vVOLu is used in the storage system 300.

The shared memory (not shown in the drawing) in the third storage apparatus 60 also stores a storage-side path switching program, volume information table, and alternate volume information table, which are the same as the storage-side path switching programs 70 and 44, volume information tables 71 and 44, and alternate volume information tables 72 and 46 explained in Embodiments 1 and 2, so their explanations will be omitted.

(3-2) Procedure to Work Volume Switching Function

In the above-structured storage system 300, an alternate volume is set as follows.

As explained in Embodiment 2, as instructed by the host system 2, the volume information for the volume X VOLx in the external storage apparatus 50 is mapped onto the volume Y VVOLy in the first storage apparatus 4 as well as volume Z vVOLz in the second storage apparatus 40 so that the volume Y VVOLy and volume Z vVOLz are set as alternate volumes for the volume X VOLx.

Likewise, the volume information for the volume Y VVOLy is mapped onto the volume U vVOLu in the third storage apparatus 60. The first storage apparatus 4 sends, in addition to the volume information for its own volume Y VVOLy, the volume information for the volume X VOLx as well as volume information for the volume Z vVOLz to the host system 2 as a response to an inquiry command. Meanwhile, the third storage apparatus 60 sends as a response to the host system 2, the volume information for the volume Y VVOLy in addition to the volume information for its own volume U vVOLu.

Based on these responses, the host system 2 sets the volume Y VVOLy and volume U vVOLu as alternate volumes for the volume X VOLx because the volume Y VVOLy and volume U vVOLu both store the same information, i.e., the volume information for the volume Y VVOLy.

Figure 27:
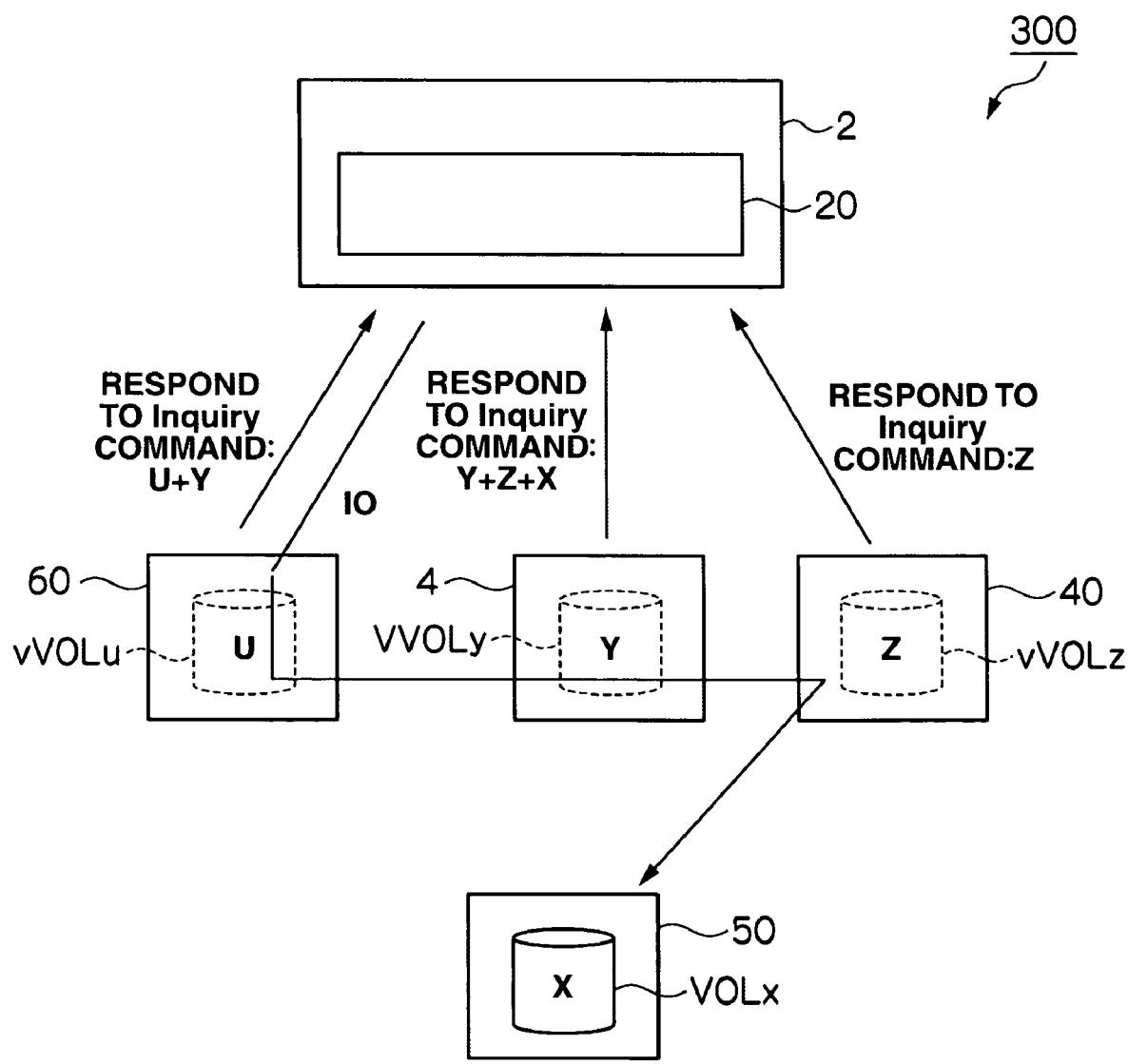
FIG. 27 is a diagram explaining the concept of the volume switching function according to Embodiment 3.

Thus, the host system 2 identifies that the volume Y VVOLy and volume Z vVOLz are a pair of alternate volumes storing the same information and that the volume Y VVOLy and volume U vVOLu are another pair of alternate volumes storing the same information, respectively. Accordingly, when the host system 2 issues a data read/write request to the external storage apparatus 50, data is sent to the relevant virtual volume having the same information as that in a volume in the external storage apparatus 50 as shown in FIG. 27. In other words, the data is sent from host system 2 to the external storage apparatus 50 via the volume U vVOLu, volume Y VVOLy and volume Z vVOLz. Incidentally, in Embodiment 3, it is assumed that the access destination for the host system 2 is the volume U vVOLu, however, it may also be the volume Y VVOLy or volume Z vVOLz if an alternate path is set correspondingly.

(3-3) Effects of Embodiment 3

According to Embodiment 3, because the migration of an access destination for the host system 2 to any one of the first to third storage apparatuses 4, 40, 60 is performed by migrating the access destination from a substantial volume VOL in a migration source to a virtual volume (VVOLy, vVOLz, or vVOLu) in a migration destination, it is possible to migrate the access destination volume without having to suspend the transmission of data between the host system 2 and storage apparatuses 4, 40, 50, and 60.

Moreover, because the migration of an access destination for the host system 2 between different types of storage apparatuses 4, 40, 50, and 60 is performed by mapping the same information as the information in a substantial volume (VOLx) to virtual volumes (VVOLy, vVOLz, and vVOLu) in the first to third storage apparatuses 4, 40 and 60 and associating their management information one another, it is unnecessary to change the micro program in the migration source external storage apparatus 50, and the change processing required for the migration can be performed smoothly.

Furthermore, because the virtual volumes (VVOLy, vVOLz, and vVOLu) are used as alternate volumes and the host system 2 distributes data transmission tasks between these virtual volumes, the virtual volumes in the storage apparatuses can be clustered and the data sent to the respective volumes can be consistent.

(4) Embodiment 4

(4-1) Structure of Storage System in Embodiment 4

The storage system 400 according to Embodiment 4 will be explained below. In this embodiment, the same components as those in Embodiments 1, 2 and 3 are given the same reference numerals. The structure in Embodiment 4 is made by combining two storage systems 200 according to Embodiment 2 so only configurations different from those in Embodiment 2 will be explained.

The storage system 400 according to Embodiment 40 has a structure where two storage systems 200 according to Embodiment 2 are connected in parallel.

Figure 28:
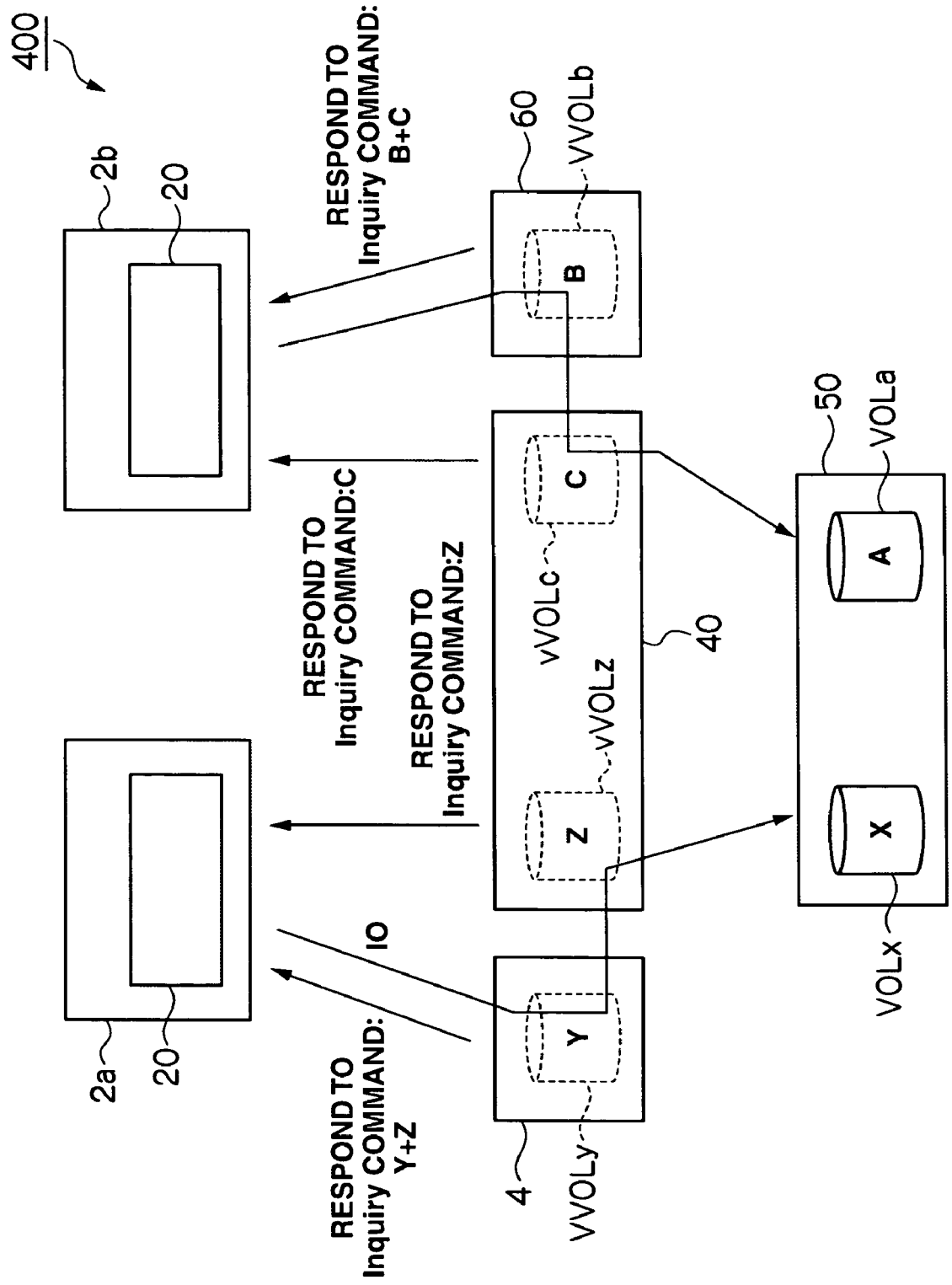
FIG. 28 is a diagram explaining the concept of the volume switching function according to Embodiment 4.

To be precise, in the storage system 400, as shown in FIG. 28, a host system 2a is connected via a network (not shown in the drawing) to the first storage apparatus 4, and the first storage apparatus 4, second storage apparatus 40 and external storage apparatus 50 are connected to one another. Likewise, a host system 2b is connected via a network (not shown in the drawing) to the second storage apparatus 40, and the second storage apparatus 40, third storage apparatus 60, and external storage apparatus 50 are connected to one another.

In response to a mapping request from the host systems 2, the volume information for the volume X VOLx in the external storage apparatus 50 is mapped onto both the volume Y VVOLy in the first storage apparatus 4 and volume Z vVOLz in the second storage apparatus 40; and the volume information for the volume A volume VOLa in the external storage apparatus 50 is mapped onto both the volume C vVOLc in the second storage apparatus 4 and volume B VVOLb in the third storage apparatus 60.

(4-2) Procedure to Work Volume Switching Function

Alternate volume setting in the above-structured storage system 400 can be carried out by executing the volume switching function working procedure explained in Embodiment 2 for both the host systems 2a and 2b in parallel, so explanations will be omitted.

As a result of executing that procedure, the host system 2a sets the volume Y VVOLy and volume Z vVOLz as a pair of alternate volumes and the host system 2b sets the volume B VVOLb and volume C vVOLc as a pair of alternate volumes.

Thus, the access destination for the host system 2a is migrated, so the host system 2a issues a data read/write request to the volume Y VVOLy or volume Z vVOLz. As shown in FIG. 28, when the host system 2a issues a data read/write request to the volume Y VVOLy, data is sent to the external storage apparatus 50 via this volume Z vVOLz.

Likewise, the access destination for the host system 2b is also migrated, so the host system 2b issues a data read/write request to the volume B VVOLb or volume C vVOLc. As shown in FIG. 28, when the host system 2b issues a data read/write request to the volume B VVOLb, data is sent to the external storage apparatus 50 via the volume C vVOLc.

(4-3) Effects of Embodiment 4

According to Embodiment 4, because the migration of an access destination for the host system 2a to the first storage apparatus 4 or second storage apparatus 40 is carried out by migrating the access destination from a substantial volume VOLx in a migration source to virtual volumes (VVOLy and vVOLz) in migration destinations, it is possible to migrate the access destination volume without having to suspend the transmission of data between the host system 2a and storage apparatuses 4, 40 and 50. The same can be said for the host system 2b.

Moreover, because the migration of an access destination for the host system(s) 2a and 2b between different types of storage apparatuses 4, 40, 50, and 60 is carried out by mapping the same volume information as that in a substantial volume (VOLx) onto the virtual volumes (VVOLy and vVOLz); mapping the same volume information as that in substantial volume VOLa onto the virtual volumes (vVOLb and vVOLc); and associating these pieces of the same information with one another, it is unnecessary to change the micro program in the migration source external storage apparatus 50, and the change processing required for the migration can be performed smoothly.

Furthermore, because the virtual volumes (VVOLy, vVOLz, VVOLb, and vVOLc) are used as alternate volumes and the host systems 2a and 2b distribute data transmission tasks between these virtual volumes, the virtual volumes in the storage apparatuses can be clustered and the data sent to the respective volumes can be consistent.

(5) Other Embodiments

The foregoing embodiments were explained for the case where, in a storage system 1 composed of a host system 2 for issuing data read/write requests, an external storage apparatus 50 having external logical volumes VOL0-n for storing data, and a first storage apparatus 4 having a first virtual logical volume VVOLy, the host system 2 makes a request to the first storage apparatus 4 to map the volume information for the external logical volume VOLx (SP1: mapping request); the first storage apparatus 4 maps, in accordance with the mapping request from the host system 2, the volume information for the external logical volume VOLx onto the first virtual volume VVOLy (SP4: first mapping) and sends the volume information for the external logical volume VOLx and volume information for the first virtual logical volume VVOLy to the host system 2 (SP10: first sending); the host system 2 searches for, based on the volume information for the external logical volume VOLx sent from the first storage apparatus 4, the virtual logical volume having the same volume information as that for the first virtual logical volume VVOLy or the external logical volume VOLx (SP11: search); and, if the virtual logical volume searched for is the first virtual logical volume VVOLy, the host system 2 sets the first virtual logical volume VVOLy as an alternate volume (SP14: setting). However, these steps may alternatively be performed by individual hardware units, i.e., a mapping requesting unit, first mapping unit, first sending unit, searching unit, and setting unit.

Moreover, in the foregoing embodiments, the host system 2 sets an alternate volume attribute so that a virtual logical volume having the same volume information as the volume information for the first virtual logical volume VVOLy or external logical volume VOLx can be used as an alternate volume and the host system 2 checks, when the virtual logical volume is searched for during the search, the alternate volume attribute (SP23, SP24). However, these steps may alternatively be performed by an independent hardware unit, i.e., a judging unit.

In the foregoing embodiments, the host system 2 makes a request to the external storage apparatus 50 to send the volume information for the external logical volume VOLx to itself in order to search for a relevant virtual logical volume (SP12: information sending request). However, this step may alternatively be performed by independent hardware, i.e., an information requesting unit.

The foregoing embodiments were also explained for the case where, in the storage system further including a second storage apparatus 40 having a second virtual logical volume vVOLz, the host system 2 makes a request to this second storage apparatus 40 to map the volume information which is composed of management information for an external logical volume (SP52: mapping request); the second storage apparatus 40 maps, in accordance with the mapping request from the host system 2, the volume information for the external logical volume VOLx onto the second virtual logical volume vVOLz (SP55: second mapping); the host system 2 searches for, based on the volume information for the first virtual logical volume VVOLy, the virtual logical volume having the same volume information as the volume information for the first virtual logical volume VVOLy or external logical volume VOLx (SP69: search); the second storage apparatus 40 sends the mapped volume information for the second virtual logical volume vVOLz to the host system 2 (SP71: second sending); and the host system 2 sets, based on the volume information for the first virtual logical volume VVOLy and second virtual logical volume vVOLz, the first virtual logical volume VVOLy and second virtual logical volume vVOLz as alternate volumes (SP72: setting). However, these steps may alternatively be performed by individual hardware units, i.e., a mapping requesting unit, second mapping unit, search unit, second sending unit, and setting unit.

INDUSTRIAL APPLICABILITY

This invention can be widely applied to storage systems having one or more storage apparatuses and other types of storage systems.

What is claimed is:

1. A storage system comprising:
   a host system that issues a data read/write request;
   an external storage apparatus that provides an external logical volume for storing the data; and
   a first storage apparatus that creates a first virtual logical volume, wherein,
   the host system makes a request to the first storage apparatus to map volume information composed of management information for the external logical volume;
   in response to the mapping request, the first storage apparatus maps the volume information for the external logical volume onto the first virtual logical volume and sends the volume information for the external logical volume and first virtual logical volume to the host system;
   based on the volume information for the external logical volume sent from the first storage apparatus, the host system searches for any virtual logical volume having the same volume information as the volume information for the first virtual logical volume or external logical volume, and sets the virtual logical volume searched for in this search as an alternate volume for receiving requests to read/write data from/to the external logical volume.

2. The storage system according to claim 1, wherein the host system sets an alternate volume attribute for the virtual logical volume having the same volume information as the volume information for the first virtual logical volume or external logical volume, and checks the alternate volume attribute when the virtual logical volume is searched for in the foregoing search.

3. The storage system according to claim 1, wherein the host system makes a request to the external storage apparatus to send the volume information for the external logical volume to itself in order to search for any virtual logical volume having the same information as the volume information for the first virtual logical volume or external logical volume.

4. The storage system according to claim 1, further comprising a second storage apparatus that creates a second virtual logical volume, wherein
   the host system makes a request to the second storage apparatus to map the volume information composed of the management information for the external logical volume;
   in response to the mapping request, the second storage apparatus maps the volume information for the external logical volume to the second virtual logical volume;
   based on the volume information for the external logical volume sent from the first storage apparatus, the host system searches for any virtual logical volume having the same volume information as the volume information for the first virtual logical volume or external logical volume;

the second storage apparatus sends the volume information for the mapped second virtual logical volume to the host system; and based on the volume information for the first virtual logical volume and second virtual logical volume, the host system sets the virtual logical volume searched for in the search as an alternate volume for receiving requests to read/write data from/to the external logical volume.

5. The storage system according to claim 4, wherein if the volume information for the first virtual logical volume is the same as the volume information for the second virtual logical volume, the host system sets the first virtual logical volume and second virtual logical volume as a pair of alternate volumes.

6. The storage system according to claim 4, wherein when the virtual logical volume searched for in the search turns out to be both the first virtual logical volume and second virtual logical volume, the host system sets an alternate path to select which volume out of the first virtual logical volume and second virtual logical volume to use as an alternate volume.

7. A data management and migration method performed in a storage system comprising: a host system that issues a data read/write request; an external storage apparatus that provides an external logical volume for storing the data; and a first storage apparatus that creates a first virtual logical volume, comprising:

a step in which the host system makes a request to the first storage apparatus to map volume information composed of management information for the external logical volume;

a step in which, in response to the mapping request, the first storage apparatus maps the volume information for the external logical volume onto the first virtual logical volume and sends the volume information for the external logical volume and first virtual logical volume to the host system; and a step in which, based on the volume information for the external logical volume sent from the first storage apparatus, the host system searches for any virtual logical volume having the same volume information as the volume information for the first virtual logical volume or external logical volume, and sets the virtual logical volume searched for in this search as an alternate volume for receiving requests to read/write data from/to the external logical volume.

8. The data management and migration method according to claim 7, wherein the host system sets an alternate volume attribute for the virtual logical volume having the same volume information as the volume information for the first virtual logical volume or external logical volume, and checks the alternate volume attribute when the virtual logical volume is searched for in the foregoing search.

9. The data management and migration method according to claim 7, wherein the host system makes a request to the external storage apparatus to send the volume information for the external logical volume to itself in order to search for any virtual logical volume having the same information as the volume information for the first virtual logical volume or external logical volume.

10. The data management and migration method according to claim 7, wherein:

the host system makes a request to the second storage apparatus to map the volume information composed of the management information for the external logical volume;

in response to the mapping request, the second storage apparatus maps the volume information for the external logical volume to the second virtual logical volume;

based on the volume information for the external logical volume sent from the first storage apparatus, the host system searches for any virtual logical volume having the same volume information as the volume information for the first virtual logical volume or external logical volume;

the second storage apparatus sends the volume information for the mapped second virtual logical volume to the host system; and based on the volume information for the first virtual logical volume and second virtual logical volume, the host system sets the virtual logical volume searched for in the search as an alternate volume for receiving requests to read/write data from/to the external logical volume.

11. The data management and migration method according to claim 10, wherein if the volume information for the first virtual logical volume is the same as the volume information for the second virtual logical volume, the host system sets the first virtual logical volume and second virtual logical volume as a pair of alternate volumes.

12. The data management and migration method according to claim 10, wherein when the virtual logical volume searched for in the search turns out to be both the first virtual logical volume and second virtual logical volume, the host system sets an alternate path to select which volume out of the first virtual logical volume and second virtual logical volume to use as an alternate volume.

\* \* \* \* \*